United States Patent [19]
Yagi et al.

[11] Patent Number: 6,154,302
[45] Date of Patent: Nov. 28, 2000

[54] LIGHT DEFLECTION DEVICE AND ARRAY THEREOF

[75] Inventors: Takayuki Yagi, Yokohama; Hajime Sakata, Atsugi; Etsuro Kishi, Sagamihara, all of Japan

[73] Assignee: Canon Kabushiki Kaisha, Tokyo, Japan

[21] Appl. No.: 09/191,534

[22] Filed: Nov. 13, 1998

[30] Foreign Application Priority Data

Nov. 15, 1997 [JP] Japan ................................. 9-331325
May 13, 1998 [JP] Japan ................................ 10-148380

[51] Int. Cl.⁷ .................................................. G02B 26/08
[52] U.S. Cl. ........................ 359/198; 359/200; 359/201; 359/212; 359/223
[58] Field of Search .................................. 359/198, 200, 359/212, 216–219, 222, 223, 226, 201, 202, 833, 871, 872, 211; 310/90

[56] References Cited

U.S. PATENT DOCUMENTS

| 5,061,049 | 10/1991 | Hornbeck | 359/224 |
| 5,430,571 | 7/1995 | Witteveen | 359/216 |

FOREIGN PATENT DOCUMENTS

| 0 598 950 | 6/1994 | European Pat. Off. . |
| 55-147602 | 11/1980 | Japan . |
| 62-239112 | 10/1987 | Japan . |
| 7-113967 | 5/1995 | Japan . |
| 7-333528 | 12/1995 | Japan . |
| WO 87/07707 | 12/1987 | WIPO . |
| WO 93/06510 | 4/1993 | WIPO . |
| WO 97/33267 | 9/1997 | WIPO . |

OTHER PUBLICATIONS

Toshiyoshi, H. et al., "Fabrication and Operation of Electrostatic Micro Torsion Mirrors for Optical Switches," Technical Digest of the 14th Sensor Symposium, pp 275–278 (1996). (No Month).

*Primary Examiner*—James Phan
*Attorney, Agent, or Firm*—Fitzpatrick, Cella, Harper & Scinto

[57] ABSTRACT

A light deflection device includes a deflection member having a sphere body enclosing a deflection face portion for deflecting a light beam, or a segmental sphere body having the deflection face portion and a segmental sphere face opposing to the deflection face portion. The device also includes a supporting member for supporting the deflection member in a turnable manner, and a driver for turning the deflection member. The driver is provided on the sphere face of the deflection member, and at a position opposing the sphere face or the segmental sphere face of the deflection member to apply a driving force to the sphere face or the segmental face. In one embodiment, a light deflection device array includes the arrangement of light deflection devices in a one-dimensional or two-dimensional array.

22 Claims, 13 Drawing Sheets

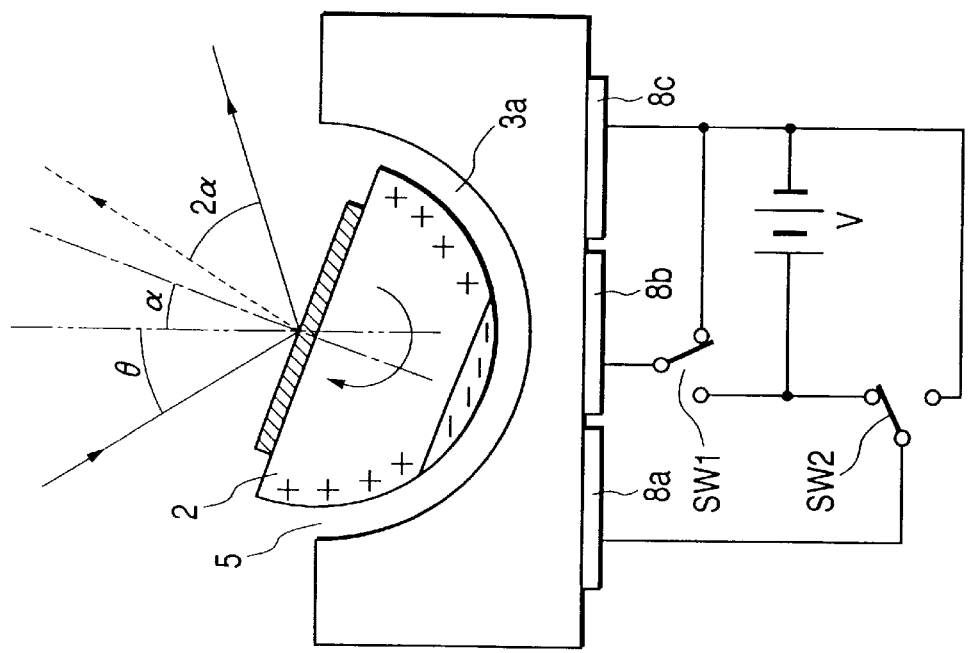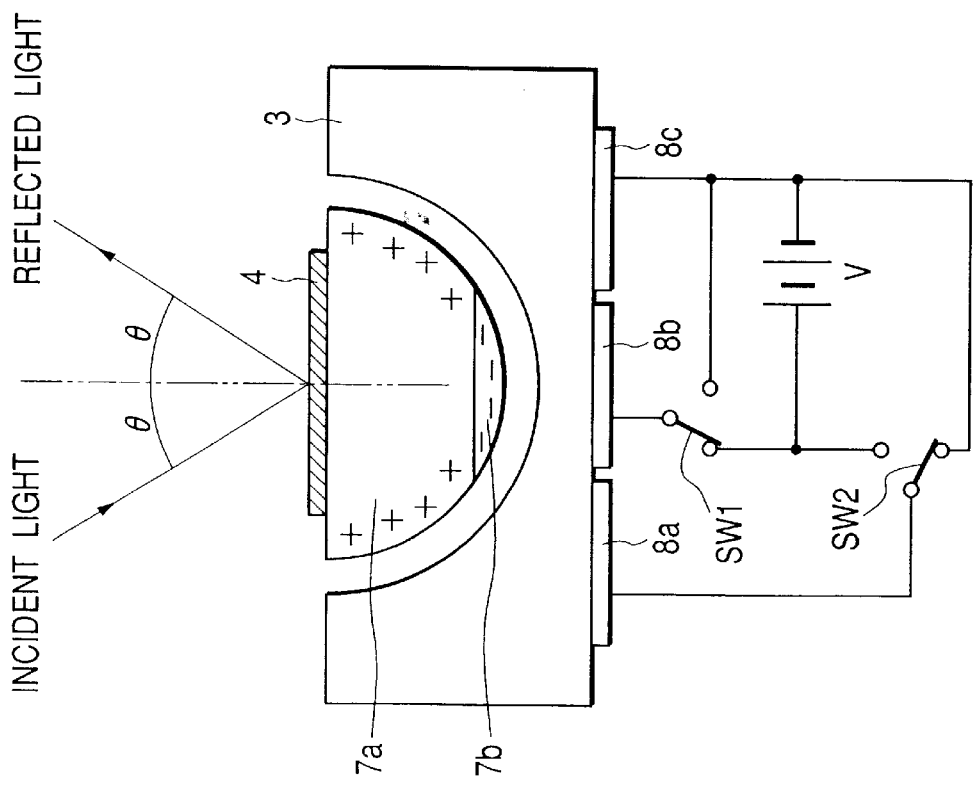

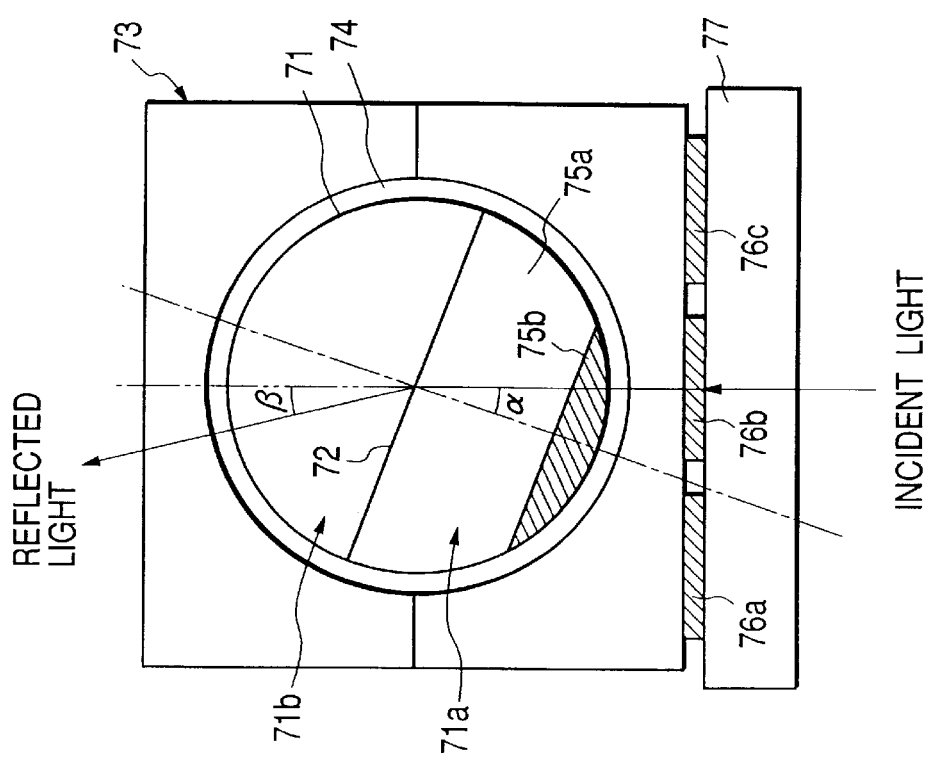
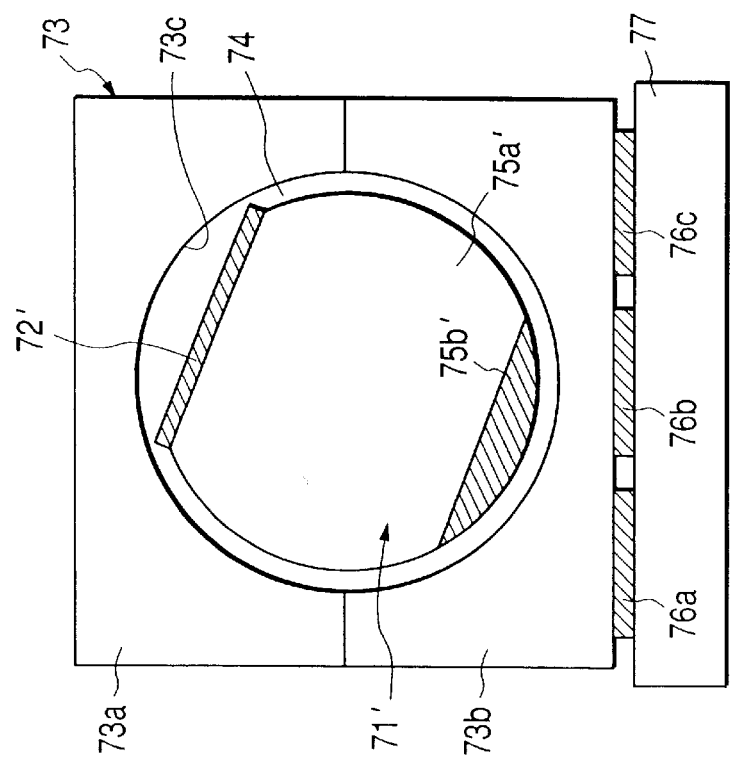

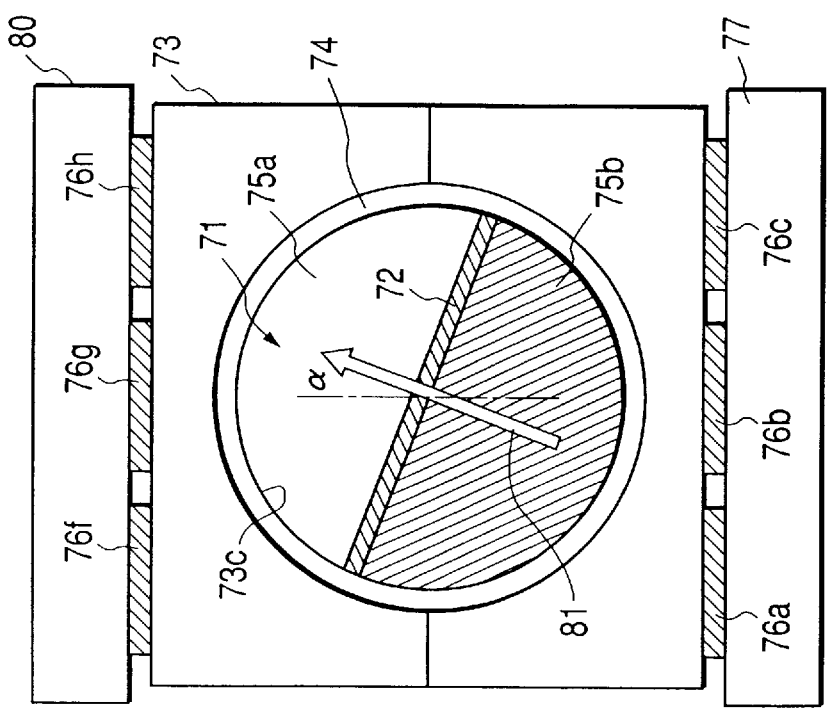
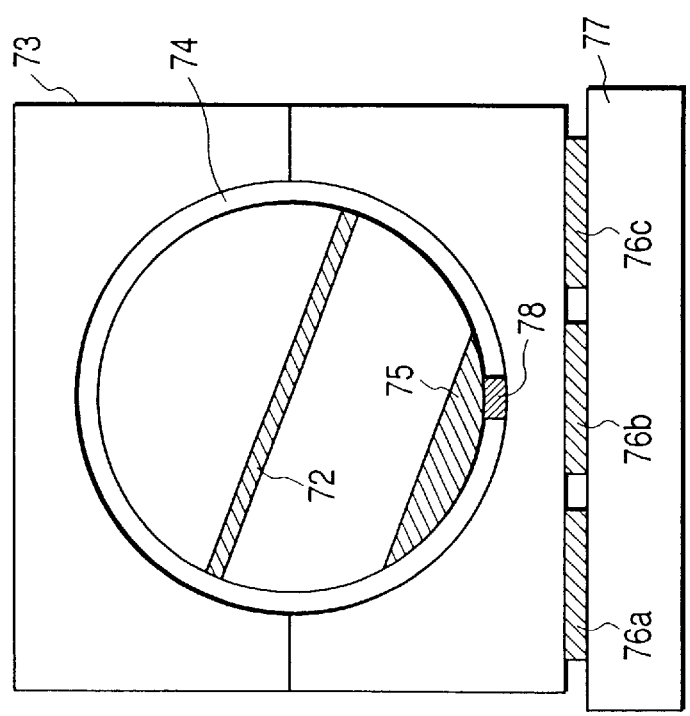

LIGHT DEFLECTION DEVICE AND ARRAY THEREOF

BACKGROUND OF THE INVENTION

1. Field of the Invention

The present invention relates to a light deflection device for arbitrary interconnection by light wave between desired spots. Particularly, the present invention relates to a light deflection device suitable for optical interconnection such as optical interconnection between elements in an integrated circuit, within or between apparatuses; optical switching for switch-over of transmitted optical data; and optical information processing.

2. Related Background Art

Holograms, liquid crystal switch arrays, and the like have been studied as a light deflection device for optical interconnection for programmable circuit connection. A deflection direction-variable hologram can be constituted with an optical writing type of spatial optical modulator. However, it requires interference exposure of a liquid crystal or an optical crystal, which complicates construction of the apparatus. Besides, a liquid crystal two-way switch array applicable therefor, but it requires multiple or repeated switching, complicating the apparatus, and its switching speed is lower owing to the liquid crystal properties.

Differently from the above optical deflection mechanism employing light diffraction or light refraction change, techniques are disclosed which control the light deflection by tilting a mirror according to micromechanics. For example, L. H. Hornbeck, et al. discloses a spatial optical modulator which changes the direction of reflection of an incident light beam by uniaxial turning of a thin metal plate mirror by electrostatic force (U.S. Pat. No. 5,061,049). H. Toshiyoshi, et al. discloses an optical cross connector between optical fibers by uniaxial turning of a mirror by a similar driving principle (H. Toshiyoshi, et al. "Fabrication and Operation of Electrostatic Micro Torsion Mirrors for Optical Switches", Technical Digest of 14th SENSOR SYMPOSIUM, pp.275–278, 1996). Such a thin film mirror enables miniaturization of the light deflection device and increase of the deflection angle. However, in the above devices, the light deflection direction is binarized. That is, the above device is a two-way optical switch, in which the thin film plate is moved by balance of a spring force with a magnetic force, the former varying depending linearly on spring elongation, and the latter varying depending on a reversed square of a distance, which is not suitable for fine control. Therefore, for deflection to an arbitrary direction, the device should be provided in multiplication for the switching.

Another technique employs a mirror other than the thin film plate and is disclosed in Japanese Patent Application Laid-Open No. 7-333528 in which a hemisphere having a flat face as a mirror is placed in a concave filled with an optical oil, and the hemisphere is turned by a non-contacting or contacting driving mechanism placed in opposition to the flat face. This device is capable of deflecting an incident light beam to an arbitrary direction by turning the hemisphere body, rendering multi-switching unnecessary.

With the above light deflection device, to stop the hemisphere body being turned by the torque exerting to the flat face of the hemisphere body at a desired position as shown in FIG. 1A, the same strength of torque as that for the turning direction should be applied in the reverse direction. If the torque (F1×r1) for the turning movement is not equal to the torque (F2×r2) for stopping the turning movement, the hemisphere body 81 will turn to the resultant torque direction. The total resultant torque should be zero to stop the turning. Further, in a freely turnable hemisphere body, the positions of the torque application points (r1, r2) are not fixed, but shift to positions (r1+δ1, r2+δ2) depending on the turning angle θ as shown in FIG. 1B.

Practically, in this contact type driving mechanism of this light deflection device, the turning movement of the hemisphere body may be stopped by pressing the flat face portion against the concave without application of a stopping torque independently of the position of the action point. However, in this operation, excessively strong force is applied to the contact points on the flat face, and the contact point between the hemisphere and the concave tends to cause plastic deformation of the hemisphere and the concave and to lower the durability of the light deflection device. Further, the contact type of driving mechanism requires a movable element such as an electromagnetic actuator, complicating the apparatus and inhibiting miniaturization of the apparatus and device arraying. Furthermore, such a driving mechanism having the movable element is not readily sealed tightly to prevent leakage of the optical oil from the concave.

On the other hand, a non-contact type driving mechanism is advantageous in miniaturization and arraying of the device, and can readily enclose the optical oil by eliminating the movable element. However, in the non-contact type driving mechanism, the forces (F1, F2) and the force application points (r1, r2) both vary depending on the tilting angle of the hemisphere body, since the forces (F1, F2) such as electrostatic forces and magnetic forces depend on the distance from the flat face of the hemisphere and the force application points (r1, r2) shift thereby. Therefore, the tilting angle of the hemisphere is not readily controllable. However, it has the aforementioned advantages. In consideration of the torque control for stopping the turning movement of the hemisphere, the non-contact type driving mechanism has difficulty in torque control disadvantageously owing to many parameters involved, since the forces (F1, F2) such as electrostatic forces and magnetic forces depend on the distance from the flat face of the hemisphere, or the tilt angle of the hemisphere, and the force application points (r1, r2) also depend on the tilt angle as shown in FIGS. 1A and 1B.

A non-contact type driving mechanism as shown in FIG. 2A is disclosed in Japanese Patent Application Laid-Open No. 7-333528. In this constitution, hemisphere body 91 is supported only by contact portion of a conical pit. Therefore, when the attitude of the light deflection device is changed, for example reversed upside down as shown in FIG. 2B, the hemisphere is not supported. Thus, the attitude of the device is naturally limited to be controllable. In FIGS. 2A and 2B, the numeral 92 indicates flat face portion; 93, a supporting member; 96 and 102, driving electrodes respectively; 100, supporting base plate; and 103, a spacer.

In the above constitution disclosed in Japanese Patent Application Laid-Open No. 7-333528, the turning center R and the gravity center G of the hemisphere as a turning body are apart at a distance r3 as shown in FIGS. 3A and 3B. Therefore, with hemisphere body 91 and an optical oil having specific gravities different from each other, the resultant force Fg derived from gravity and buoyancy at the gravity center acts as a turning torque (Fg×r3) disadvantageously. The turning torque of the resultant force at the gravity center remains after the hemisphere has been turned by the driving mechanism to a desired position. To keep the hemisphere body at the desired position, any of the following measures should be taken: (1) a compensation torque is kept applied, (2) the static friction coefficient is increased at the contact point with the concave, and (3) the resultant force from the buoyancy and the gravity is adjusted to be zero (that is, the specific gravities of the hemisphere body and the lubricating liquid are equalized).

The above measure (1) complicates greatly the control system in an array construction of the light deflection device. The above measure (2), although effective and practicable, is not compatible basically with the lubricity, tending to render insufficient the turn movement control and to cause deterioration of the parts by friction, and moreover, rendering the friction force ineffective in a certain attitude of the light deflection device. The above measure (3) is limited in reducing the specific gravity of the hemisphere body, and selection of the construction material especially when the refractive indexes of the optical oil and the hemisphere body are required to be equal in addition to the requirement for the specific gravity.

SUMMARY OF THE INVENTION

The present invention intends to provide a light deflection device which satisfies the requirements: (1) a larger deflection angle of a light beam, (2) deflection of incident light to any desired direction, (3) ease in control of a turning direction of a light deflection member like a hemisphere and control of a deflection angle of a light beam, and (4) ease in miniaturization and linear or two-dimensional arraying of the device.

The present invention further intends, in addition to the above objects, to provide a light deflection device satisfying the requirements, in addition to the above objects: (5) controllability in any attitude of the device, and (6) excellent direction stability at a non-driven state.

The light deflection device of the present invention comprises a deflection member having a sphere body enclosing a deflection face portion for deflecting a light beam, or a segmental sphere body having the deflection face portion and a segmental sphere face opposing to the deflection face portion; a supporting member for supporting the deflection member in a turnable manner; and a driving means for turning the deflection member, the driving means is provided on the sphere face or the segmental sphere face of the deflection member and at a position opposing to the sphere face or the segmental sphere face of the deflection member to apply a driving force to the sphere face or the segmental sphere face.

With the above constitution, the force for turning the turning body, which shapes the sphere body or the segmental sphere body like a hemisphere body, is applied invariably to the torque application points on the spherical face or the segmental spherical face (hemispherical face) to prevent variation of the distance between the force application point and the turning center. Thereby, the turning direction of the turning body and the deflection angle are readily controlled. In the light deflection device of the present invention, the turning body is driven without contact of the driving means, and the driving mechanism is relatively simple, so that the device is suitable for miniaturization and arraying of the devices. Furthermore, with the light deflection device of the present invention, the controllable turning range of the turning body can be made relatively larger, whereby the deflection angle can be made larger to deflect the light beam to any desired directions.

BRIEF DESCRIPTION OF THE DRAWINGS

FIG. 6A and FIG. 6B are schematic sectional views for showing the states of the driving in the first example.

FIG. 17 is a schematic sectional view showing a seventh example of the light deflection device of the present invention.

FIG. 18 is a schematic sectional view showing a eighth example of the light deflection device of the present invention.

FIG. 19 is a schematic sectional view showing a ninth example of the light deflection device of the present invention.

FIG. 20 is a schematic sectional view showing a tenth example of the light deflection device of the present invention.

DESCRIPTION OF THE PREFERRED EMBODIMENTS

Figure 1A:
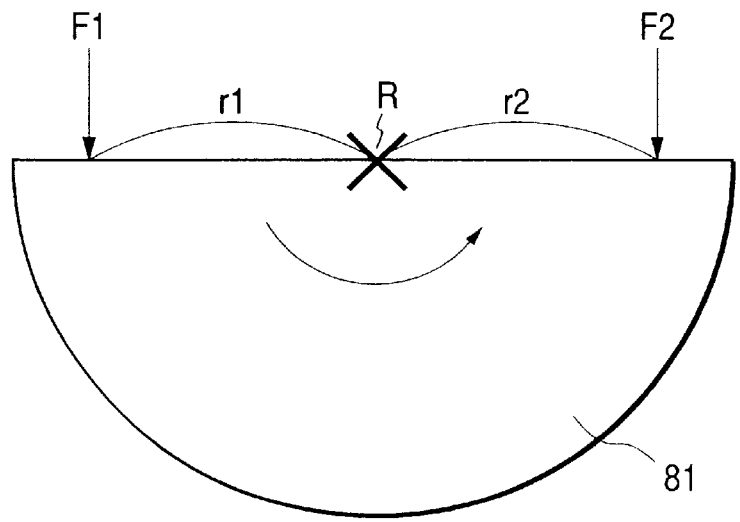
FIG. 1A and FIG. 1B are schematic sectional views for explaining generation of a torque in a conventional light deflection device.
Figure 1B:
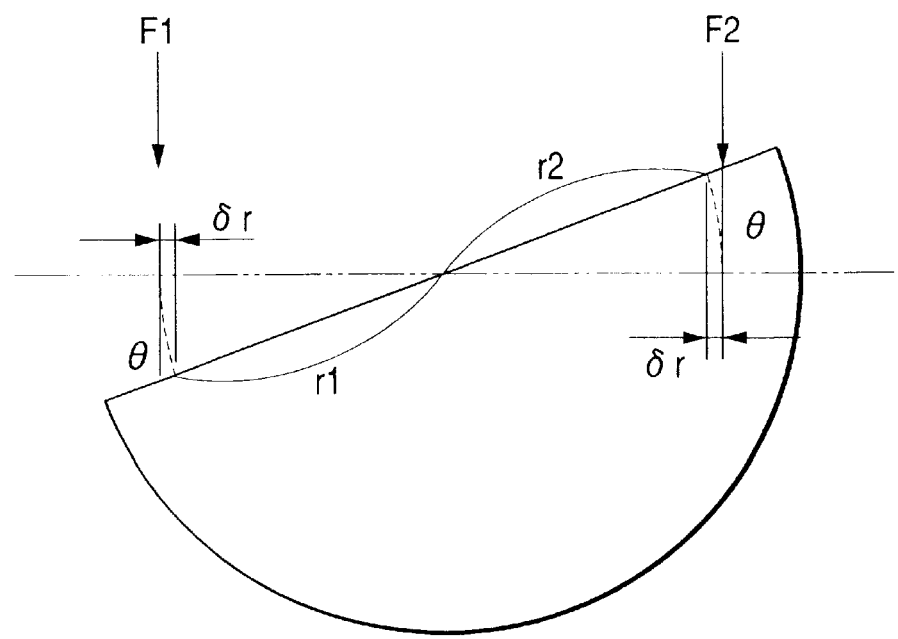

The specific embodiments of the present invention are described below.

A turning body shapes a sphere body or a segmental sphere body.

A supporting member supports a turning body to be turnable freely around the spherical center of the turning body, whereby the light beam deflection is controlled readily and precisely. The turning body may be supported as below. The supporting member has a concave or a space (a cavity) formed for supporting the turning body turnably. For supporting the turning body smoothly turnably and controllably, the turning body is supported by the concave or the space with interposition of a gap filled with a liquid. For the same purpose, the concave or the space on the base plate is preferably in a shape corresponding to the shape of the turning body (including a shape of a segmental sphere like a hemisphere). Thereby, the force which is applied to the turning body in a direction toward the center of the turning body is caught by the concave or the space to prevent displacement of the turning body to the force direction to ensure the turning movement of the turning body. The shape of the concave or the space is not limited thereto, and may be in a shape of a cone, a cylinder, or the like so long as it ensures the suitable turning movement.

The deflection face portion is typically in a shape of a flat plane. If necessary, the deflection face portion may be concave or convex. However, deflection control is easier with a flat face. The segmental sphere face is typically in a shape of a hemisphere. Thereby, the hemisphere body can readily be supported in a turnable manner, and can be relatively readily prepared.

The aforementioned driving means may be comprised as follows.

In an embodiment, the driving means comprises a charge distribution formed on a sphere face of a turning body, and a driving electrode for generating an electric field around the sphere face. In this embodiment, the gap between the supporting member and the turning body is filled with a dielectric liquid, and the regions of different charging characteristics are charged respectively with a different polarity of electric charge. The turning body is driven to turn controllably by electrostatic force generated between the regions and the electrode provided on the supporting member side. This constitution is simpler since the turning body need not be connected to electric wiring. By providing the driving electrode on another base plate in place of the supporting member side and arranging the supporting member on the base plate, the turning body also can be driven, whereby the drive-controlling circuit can be integrated on the base plate to simplify the constitution.

In another embodiment, the driving means is comprised of an electrode provided on a part of the spherical face of the turning body and another driving electrode on the supporting member. In this constitution, the turning body is turned by the electrostatic force produced by application of a voltage between the above electrodes.

In a still another embodiment, the driving means for turning the turning body may be comprised of a magnetic film formed on a portion of the turning body and an electromagnet placed on the supporting member side. In this constitution, the turning body is turned by the magnetic force produced between the magnetic film and the electromagnet.

The deflection of a light beam may be conducted either by reflection or by refraction. In the deflection by reflection, a reflection layer is formed on a reflection face portion such as a flat face portion for reflecting deflection, and the light beam is introduced from the deflection face side or the segmental sphere body side to the deflection face and is deflected by reflection at the reflection layer established on the deflection face portion. In the deflection by refraction, the segmental sphere body is transparent to the light beam to be deflected, and the refractive index of the deflection face portion is different from that of the space in contact with it. The space may be filled with a liquid having a prescribed refractive index, whereby light is deflected at the interface according to Snell's Law. This is advantageous in certain cases since the light-introducing side and the light-emitting side are opposite to each other relative to the segmental sphere body.

The light deflection device of the present invention is described in detail by reference to examples.

EXAMPLE 1

Figure 4:
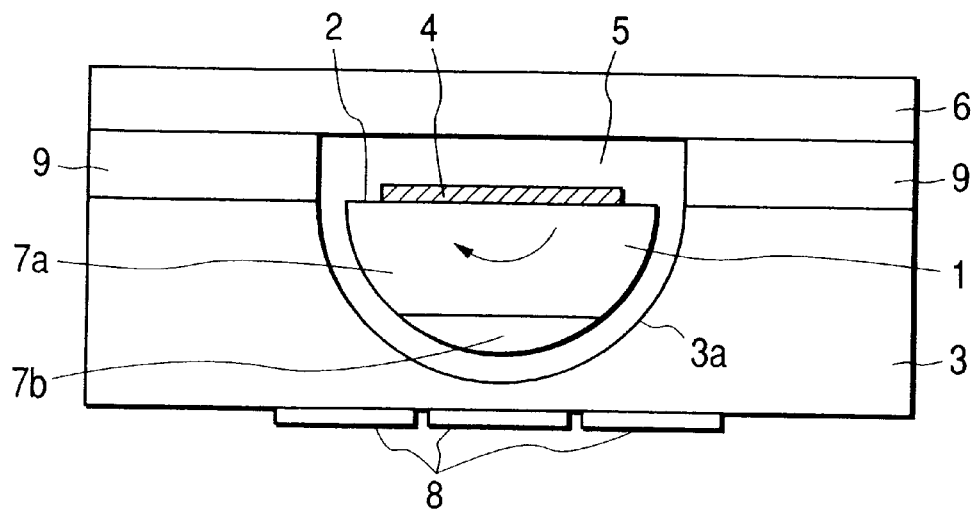
FIG. 4 is a schematic sectional view showing a first example of the light deflection device of the present invention.

FIG. 4 is a side sectional view of the light deflection device of a first example of the present invention. The light deflection device of this example comprises hemisphere body 1 having flat face portion 2 for deflecting an incident light beam, supporting member 3 for supporting hemisphere body 1 turnably in hemispherical concave 3a with a gap therebetween for turning of hemisphere body 1, and a driving means for turning hemisphere body 1. The driving means has chargeable regions 7a, 7b having different electric charging characteristics on the spherical face of hemisphere body 1 to turn hemisphere body 1. As shown in FIG. 4, chargeable region 7a is formed in a shape of a belt surrounding the hemispherical face, and chargeable region 7b is formed in a bowl shape at the bottom of the hemisphere body. Driving electrodes 8 are provided at the bottom portion of supporting member 3 to apply an electric field to charging regions 7a, 7b and vicinity thereof. The light beam is deflected at reflection layer 4 formed on flat face portion 2. The gap is filled with dielectric liquid 5 which is sealed by plane-parallel base plate 6 provided above hemisphere body 1 with interposition of spacer 9 not to prevent turning movement of hemisphere 1.

The driving method of Example 1 of the light deflection device of the present invention is described below in detail. A particle (hemisphere body 1) in dielectric liquid 5 like silicone oil exchanges electric charge with the liquid to form an electric double layer, whereby the particle is charged to be positive or negative. As described above, hemisphere body 1 of this Example has, on the spherical face, chargeable regions 7a, 7b having different charging characteristics in liquid 5. The spherical face is comprised partly of different materials (MgF$_2$ and quartz glass as described later). Thereby the surface charging quantity of hemisphere body 1 in liquid 5 is also different between chargeable regions 7a, 7b, producing an electric moment in hemisphere body 1. (In FIG. 4, the vector of the moment is directed vertical through the spherical center of hemisphere body 1.) On applying an electric field through driving electrode 8 to this hemisphere body 1, a torque is produced to equilibrate the pole direction of the electric charge (vector direction of the electric moment) of hemisphere body 1 with the formed electric field. Since the surface only is charged, the distance of the torque application point from the turning center is always equal to the radius of hemisphere body 1. When hemisphere body 1 has turned to equilibrate its charge pole with the electric field direction, the torque is offset to stop the turning movement. After the turning movement is stopped, hemisphere body 1 keeps the position fixed owing to friction between hemisphere body 1 and concave 3a, and other causes, even after the electric field is eliminated. On application of an electric field in a different direction by selecting driving electrode 8, a torque is produced to equilibrate the pole direction with the newly applied electric field to turn the hemisphere body similarly again. With the above driving means, no electric wiring to hemisphere body is necessary.

Figure 5:
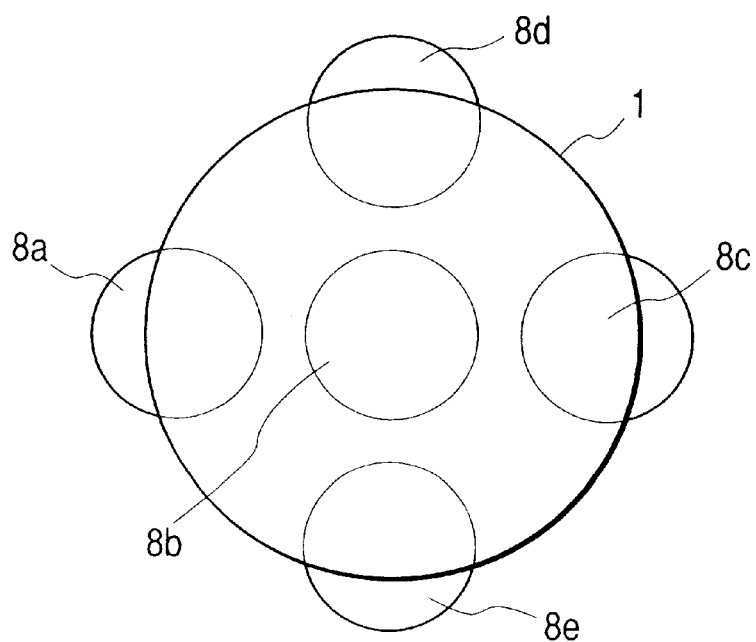
FIG. 5 is a schematic plan view of the light deflection device of the first example.

FIG. 5 is a plan view showing an example of arrangement of driving electrodes 8a, 8b, 8c, 8d and 8e relative to hemisphere body 1. With this arrangement of five electrodes 8a, 8b, 8c, 8d, and 8e, the method of driving of the light deflection device is explained in detail by reference to FIG. 6A and FIG. 6B. Hemisphere body 1 has negatively chargeable region 7b and positively chargeable region 7a, and is placed in dielectric liquid 5. An electric field is effected to this hemisphere body 1 by applying a positive voltage to central electrode 8b and a negative voltage to other driving electrodes as shown in FIG. 6A (8d and 8e at the front side and the back side are not shown in the drawing). Thereby, charged region 7b looks toward the driving electrode by bringing its charged pole in equilibrium with driving electrode 8b as shown 6A. In this state, the incident light beam at an incident angle θ (shown in FIG. 6A) is reflected at a reflection angle θ.

Then, switch SW1 is turned off and switch SW2 is turned on to apply a positive voltage to driving electrode 8a at the left side, and a negative voltage to other driving electrodes as shown in FIG. 6B (8d and 8e are not shown in the drawing). Thereby, hemisphere body 1 turns right around the spherical center in the drawing to equilibrate the charge pole direction of charged region 7b with the electric field direction to take a certain turning angle α. Thereby, the reflected light beam is deflected further by an angle 2α in comparison with that shown in FIG. 6A. By switching over the switches SW1 and SW2 again, hemisphere body 1 returns to the position as shown in FIG. 6A. In the manner shown above, the hemisphere 1 can be driven to various positions. For example, hemisphere body 1 is brought to a position intermediate between the positions in FIG. 6A and FIG. 6B by applying independently positive voltages to driving electrode 8a and driving electrode 8b, and negative voltage to other electrodes, whereby a deflection of less than 2α can be obtained. After determining the dependence of the deflection angle on the voltage application state preliminarily, hemisphere body 1 can be turned under control to obtain a desired deflection angle according to the memorized information on the dependence.

Next, an process for production of the light deflection device of this Example is shown below. Hemisphere body 1 is prepared from a micro-bead of about 100 μm diameter of quartz glass for a collimator lens of light-emitting diode. A part of the bead is removed by polishing to form flat face portion 2. The flat face of this hemisphere body 1 is fixed onto an adhesive tape, and onto the spherical face of hemisphere 1, $MgF_2$ is vacuum vapor-deposited by sputtering to form chargeable region 7a. Thereafter, a photoresist is applied onto the surface of hemisphere 1. The photoresist on a predetermined region of the hemispherical face (corresponding to chargeable region 7a or 7b) is developed by light exposure. $MgF_2$ on the region corresponding to chargeable region 7b is removed by ion etching with Ar to bare a portion of the quartz glass to form chargeable region 7b. Then, spherical face side of hemisphere body 1 is fixed onto an adhesive tape, and the aforementioned adhesive tape on the flat face side is removed. On flat face portion 2, an aluminum film is formed as reflection layer 4 by electron beam vapor deposition. The adhesive tape is taken off and the photoresist is removed to complete hemisphere 1 of quartz glass having chargeable regions 7a, 7b of different charging characteristics and reflection layer 4 on flat face portion 2 as shown in FIG. 4.

Supporting member 3 is also made from quartz glass. On the bottom face of the quartz glass plate, a transparent electroconductive ITO film is formed by vacuum vapor deposition, and driving electrodes 8a to 8e are formed through photolithography process and etching as shown in FIG. 4 and FIG. 5. The upper face of this quartz glass plate is coated with a Cr (chromium) film and an Au (gold) film successively by electron beam vapor deposition to form a mask. A part of the Cr—Au mask is removed by photolithography process and etching in a pattern of a circle. Through the pattern-removed portion, the quartz glass is etched off isotropically by an aqueous hydrofluoric acid solution to form a hemispherical concave 3a on supporting member 3. Into this concave 3a on supporting member 3, are placed the above hemisphere body 1 having reflection layer 4 and chargeable region 7a, 7b formed thereon, and dielectric liquid 5 comprised of silicone oil. Finally spacer 9 having a central bore is bonded onto supporting member 3 by use of an adhesive, and the top of the spacer is sealed by base plate 6 with an adhesive to enclose dielectric liquid 5 and hemisphere 1 as shown in FIG. 4.

To the light deflection device prepared as above, a voltage of +100 V was applied between driving electrode 8a and other driving electrode. Thereby, hemisphere body 1 was driven to turn by an angle α of 20° shown in FIG. 6B. Thus the deflection angle was changed by 40° from that of FIG. 6A. After the stop of turning movement of hemisphere 1, the voltage application was stopped. As the result, hemisphere body 1 did not move owing to friction through silicone oil 5 between hemisphere 1 and concave 3a and other causes, keeping the deflection angle of reflected light beam unchanged. Subsequently, a voltage of +100 V was applied between driving electrode 8c at the right side and other driving electrode. Thereby, the angle (α) changed to −20°. Thus the deflection angle was changed by −40° relative to the deflection angle of FIG. 6A. After the stop of turning movement of hemisphere 1, the voltage application was stopped to result in no change of the deflection angle. As described above, light deflection of 80° was practicable with the light deflection device of the Example. Further, light deflection of 80° in the direction perpendicular to the aforementioned deflection (perpendicular to the drawing paper sheet) could be conducted by application of voltage to driving electrode 8d, or driving electrode 8e.

EXAMPLE 2

Figure 7:
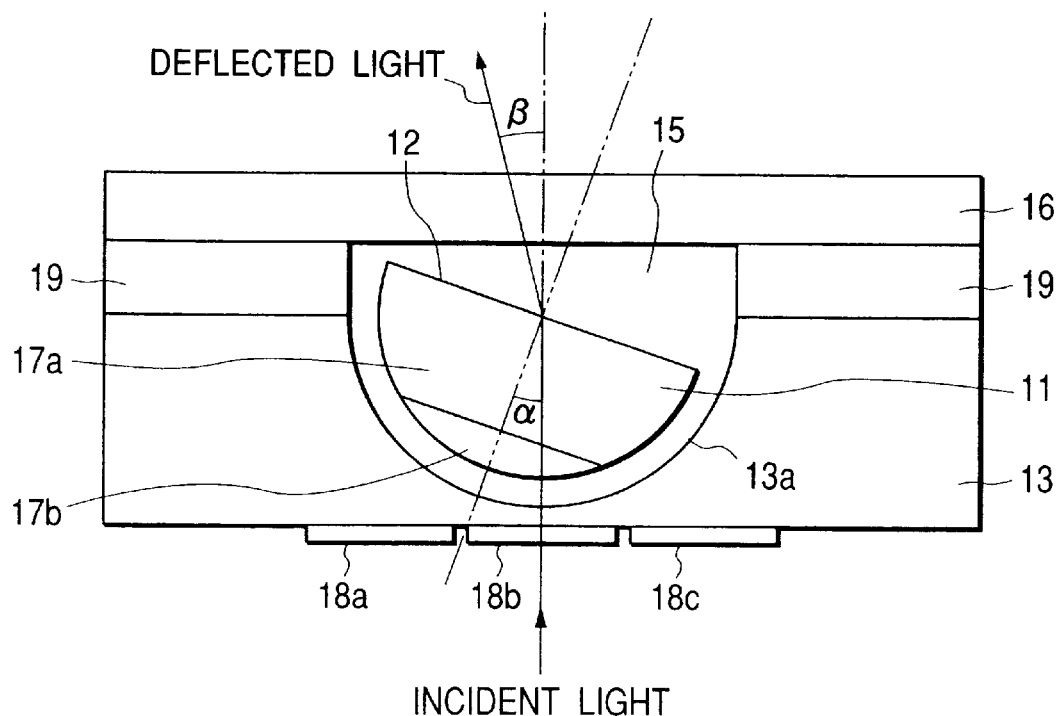
FIG. 7 is a schematic sectional view showing a second example of the light deflection device of the present invention.

FIG. 7 shows a sectional side view of a light deflection device of a second example of the present invention. The light deflection device of this example also has a supporting member 13 having a hemispherical concave 13a for supporting hemisphere body 11 turnably with a gap therebetween for turning of hemisphere body 11, and a driving means for turning hemisphere body 11. The driving means has chargeable regions 17a, 17b having different electric charging characteristics on the spherical face of hemisphere body 11, and driving electrodes 18 for applying electric field to the bottom of supporting member 13. The basic constitution is the same as that of Example 1. However, in Example 2, the light beam is introduced from the bottom face of supporting member 13 to the flat face portion (where no reflection layer is formed), and the incident light beam is deflected in a manner of transmitting by the difference between the refraction indexes of dielectric liquid 15 filled in the gap and the material of hemisphere body 11.

Above hemisphere body 11, spacer 19 is provided so as not to prevent the turning movement of hemisphere 11, and the device is sealed by base plate 16.

The light deflection device of this Example drives hemisphere body 11 to turn by a driving means similar to that in Example 1. Specifically, in liquid 15, an electric field is applied, from driving electrodes 18, to an electric moment produced by charged regions 17a, 17b having different surface charges on hemisphere body 11 to turn hemisphere body 11 so as to equilibrate the charge pole direction with the electric field. In this turning movement, the distance between the torque application point and the turning center is equal to the spherical radius of hemisphere body 11 as mentioned in Example 1. After the turning movement has stopped, hemisphere 11 keeps the position fixed, without the electric field application. On application of an electric field in a different direction, a torque is produced similarly to equilibrate the pole direction with the applied electric field to turn the hemisphere 11 similarly again. With the above driving means, no electric wiring to hemisphere body is necessary similarly as in Example 1.

The principle of the deflection in Example 2 is described below. When hemisphere body 11 is turned by an angle α, relative to the incident light beam introduced through the bottom of supporting member 13, by the aforementioned driving means, the angle β of deflection from the incident light beam is shown by the equation below according to Snell's Law:

$$\beta = \sin^{-1}[(n_2 \cdot \sin \alpha)/n_1] - \alpha$$

where $n_1$ is the refractive index of dielectric liquid 15, and $n_2$ is the refractive index of hemisphere body 11.

Specifically, the light deflection device was produced in the same manner as in Example 1 except that hemisphere body 11 was prepared from a micro-bead having a refraction index of 1.9 and a diameter of 100 μm for collimator lens, no reflection layer is formed on hemisphere body 11, and methyl alcohol of refraction index 1.33 was used as dielectric liquid 15. The arrangement of driving electrodes 18a, 18b, 18c, 18d, and 18e (18d and 18e being not shown in the drawing) relative to hemisphere body 11 was the same as that in Example 1. On application of a voltage of +100 between driving electrode 18a and other driving electrodes, hemisphere body 11 turned at angle α of 20° as shown in FIG. 7. After stop of the turning movement, the angle α was kept unchanged without the voltage application. From the above specific numerical values, the angle β was calculated to be 9° according to the above equation. That is, the reflected light beam was deflected by 9° relative to the incident light beam.

EXAMPLE 3

Figure 8:
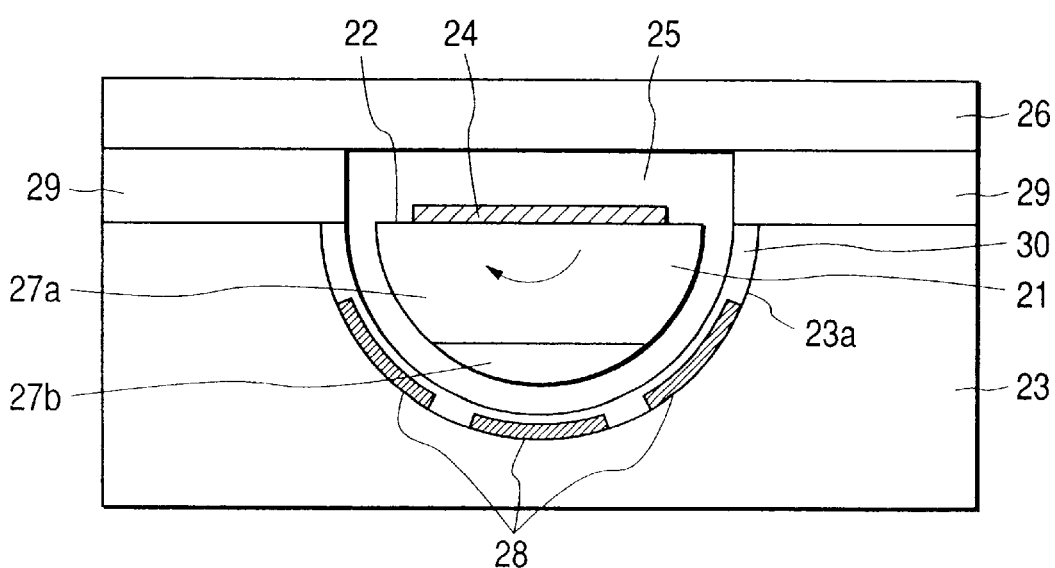
FIG. 8 is a schematic sectional view showing a third example of the light deflection device of the present invention.

FIG. 8 is a sectional side view of a third example of the light deflection device of the present invention. In this Example, driving electrodes 28 are formed on the face of concave 23a of supporting member 23 for supporting hemisphere body 21, and insulation layer 30 is formed on driving electrodes 28. Otherwise the constitution is the same as that in Example 1.

The deflection device of this Example also comprises hemisphere body 21 having a flat face portion 22 for deflecting the incident light beam, a supporting member 23 having a concave 23a for supporting hemisphere body 21 with interposition of a gap in a turnable manner. Chargeable regions 27a, 27b having different charging characteristics are provided on the spherical face of hemisphere body 21 for turning it. In the same manner as in Example 1, reflection layer 24 is formed on the flat face portion 22 to deflect the light beam by reflection. Above hemisphere body 21, spacer 29 is provided so as not to prevent the turning movement of the hemisphere body 21. Dielectric liquid 25 is filled into the gap, and the dielectric liquid 25 is sealed by base plate 26. The light deflection device of this Example turns the hemisphere body 21 by the same driving method as in Example 1.

Figure 2A:
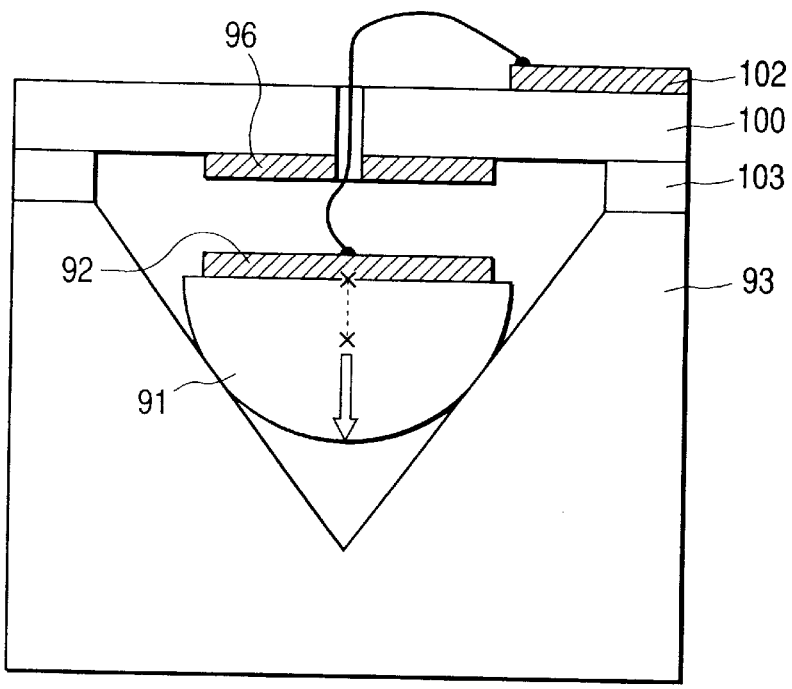
FIG. 2A and FIG. 2B are schematic sectional views for explaining a driving means in a conventional light deflection device.
Figure 2B:
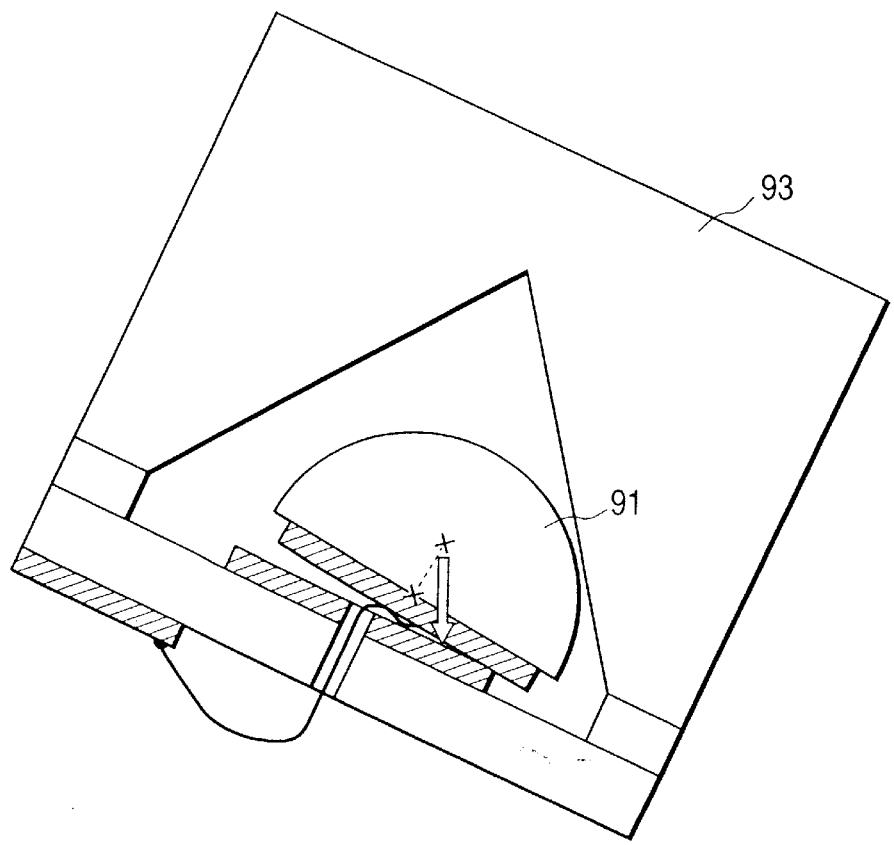
Figure 3A:
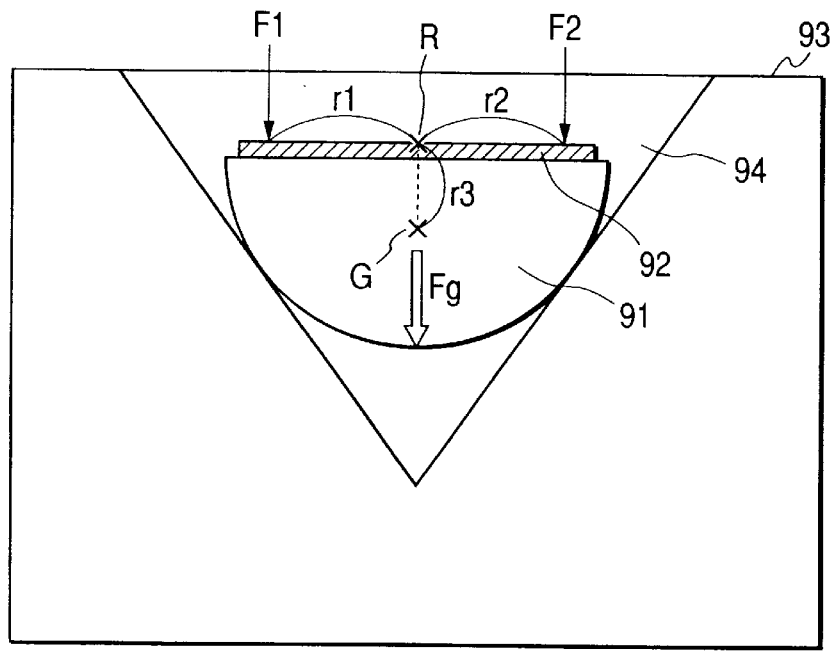
FIG. 3A and FIG. 3B are schematic sectional views for explaining the relation between the gravity center and the driving torque in a conventional light deflection device.
Figure 3B:
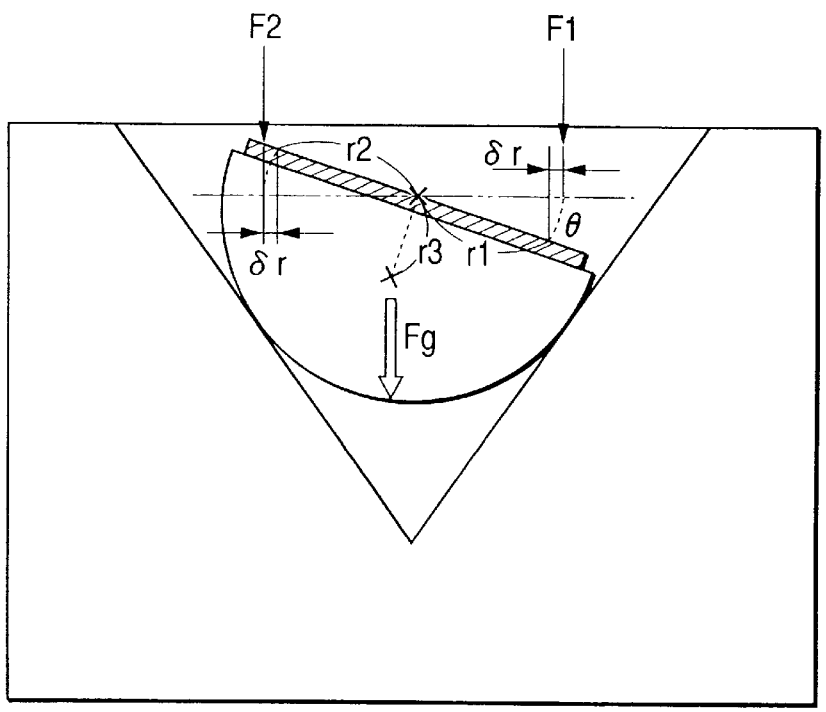

The light deflection device of this Example is prepared in the same manner as in Example 1 except for the process of forming the supporting member 23. This process is described below. The upper face of a quartz glass plate is coated with a Cr (chromium) film and an Au (gold) film successively by electron beam vapor deposition to form a mask. A part of the Cr—Au mask is removed by a photolithography process and etching in a pattern of a circle. Through the pattern-removed portion, the quartz glass is etched off isotropically by an aqueous hydrofluoric acid solution. Then the Cr—Au mask is removed to form a hemispherical concave 23a for supporting hemisphere body 21 on supporting member 23. Then the inside face of hemispherical concave 23a is coated with Al (aluminum) by sputtering. From the aluminum layer, driving electrodes 28 are formed by a photolithography process and etching as shown in FIG. 8. Driving electrodes 28 may be arranged similarly as that shown in FIGS. 2A and 2B. On driving electrodes 28, an insulating layer 30 is formed by sputtering silicon dioxide.

In the light deflection device of this Example, driving electrodes 28 are formed on the spherical face of hemispherical concave 23a of supporting member 23. Thereby, the distance between chargeable region 27a, 27b and driving electrode 28 is shortened, enabling lowering of the voltage for turning of hemisphere body 21.

EXAMPLE 4

Figure 9:
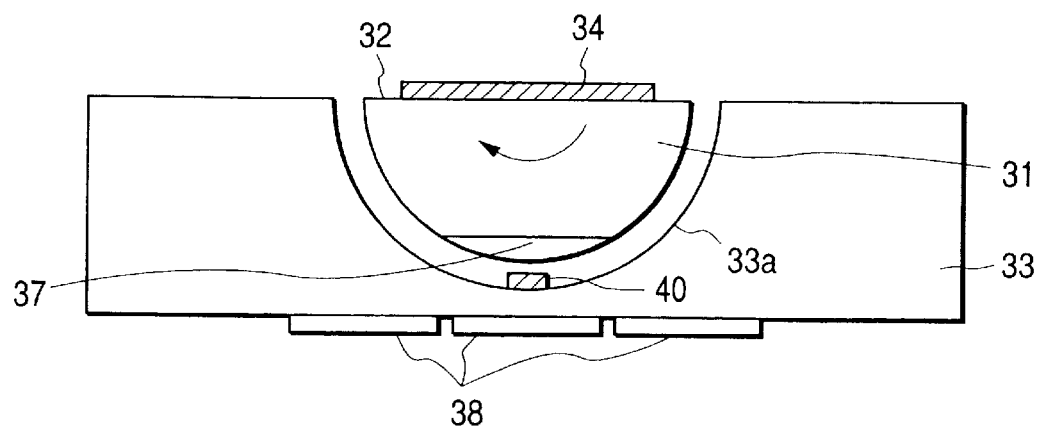
FIG. 9 is a schematic sectional view showing a fourth example of the light deflection device of the present invention.

FIG. 9 is a side sectional view of the light deflection device of a fourth example of the present invention. The light deflection device of this example comprises a hemisphere body 31 having a flat face portion 32 for deflecting an incident light beam, and a supporting member 33 for supporting the hemisphere body 31 in a turnable manner with a gap therebetween for turning of the hemisphere body 31. However, in this Example, a movable electrode 37 is provided at the bottom portion of the spherical face of the hemisphere body 31 for turning of the hemisphere body 31, driving electrodes 38 for applying electric field to movable electrode 37 are provided at the bottom of supporting member 33, and a fixed electrode 40 is formed on the face of spherical concave 33a of supporting member 33 for supporting the hemisphere body 31. Fixed electrode 40 is wired from the outside, for example, along the face of the hemispherical concave 33a. The hemisphere body 31 turns with movable electrode 37 in contact with fixed electrode 40. Fixed electrode 40 and driving electrodes 38 are connected a power source to apply a voltage therebetween. On application of a voltage to the fixed electrode 40 and driving electrode 38, the voltage is applied between the movable electrode 37 in contact with the fixed electrode 40 and driving electrode 38 to generate torque by electrostatic attraction (electrostatic force) to turn hemisphere body 31. In the above voltage application, the electric charge is formed only on the surface of the movable electrode 37, and the torque is produced by electrostatic force between the movable electrode 37 and a desired driving electrode 38. Therefore, the distance between the torque application point and the turning center is equal to the spherical radius of hemisphere body 31. By this turning movement, flat face portion 32 is tilted to reflect the incident light with deflection by reflection layer 34 formed on flat face portion 32. Fixed electrode 40 is provided such that movable electrode 37 keeps invariably the contact with the fixed electrode 40 irrespectively of turning movement of the hemisphere body 31.

A process for production of the light deflection device of this Example is described below. The hemisphere body 31 is prepared from a micro-bead of about 100 μm diameter of quartz glass for a collimator lens of light-emitting diode. A part of the bead is removed by polishing to form the flat the face portion 32. The flat face portion 32 of this hemisphere body 31 is fixed onto an adhesive tape. A photoresist is applied onto the spherical face of the hemisphere body 31. The photoresist on a predetermined region of the hemispherical face is developed by light exposure by a photolithography process to bare a portion of hemispherical face (bottom). Thereon, Pt (platinum) is vacuum vapor-deposited by sputtering. Then, spherical face side of the hemisphere body 31 is fixed onto an adhesive tape, and the aforementioned adhesive tape on the flat face side is removed. On flat face portion 32, a film of Al (aluminum) is formed as the reflection layer 34 by electron beam vapor deposition. Then the adhesive tape is taken off and the photoresist is removed to lift off the Pt formed on the photoresist to form the movable electrode 37.

The supporting member 33 is the same as the one used in Example 1. On the face of hemispherical concave 33afor supporting hemisphere body 31, a Ta (tantalum) layer is formed by electron beam vapor deposition. Fixed electrode 40 is formed by a photolithography process and etching. Movable electrode 37 and fixed electrode 40 are made from a material having a high mechanical strength, since they are invariably in contact, and slide each other on the turning movement of the hemisphere body 31.

With the light deflection device thus produced, the gap between the hemisphere body 31 and supporting member 33 was filled with a silicone oil as the dielectric liquid, and a voltage was applied between the driving electrode 38 and fixed electrode or electrodes 40 (plural driving electrodes 38 may be employed). The electrode to be employed is selected from the plural driving electrodes 38 to obtain a desired deflection angle according to the information derived from the preliminarily measured dependence of the deflection angle on the voltage application state. On the above voltage application, the hemisphere body 31 was turned by electrostatic attraction force (electrostatic force) generated between a driving electrode 38 and the movable electrode 37. Hemisphere body 31 stopped at a position where the electrostatic force passed the spherical center of hemisphere body 31, keeping this position. In this Example, the dielectric liquid is not always required. Therefore, with the same device, a voltage was applied, without silicone oil, between driving electrode 38 and fixed electrode 40, and hemisphere body 31 was found to be turned. Thus, in the light deflection device of the Example, hemisphere body 31 can be turned without the dielectric liquid by generating a torque by electrostatic force between driving electrode 38 and movable electrode 37.

EXAMPLE 5

Figure 10:
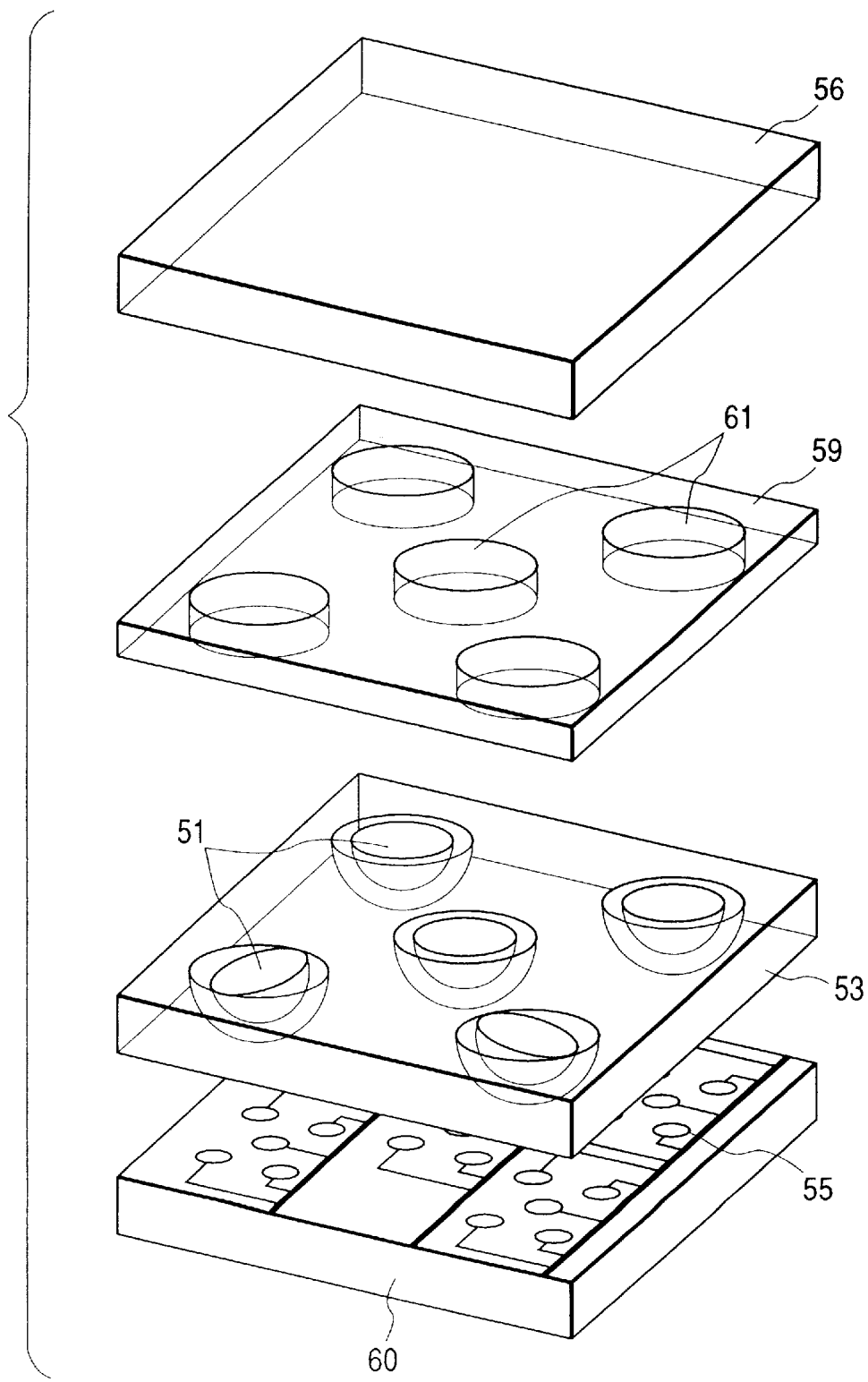
FIG. 10 is an exploded perspective view of an array of light deflection devices of in FIG. 1A and FIG. 1B described in fifth example of the present invention.

FIG. 10 is an exploded perspective view of a two-dimensional array of the light deflection devices of Example 1. The hemisphere bodies 51 for the light deflection device array were the same as the hemisphere body of Example 1 having a reflection layer on the flat face portion. The supporting member 53 had hemispherical concaves prepared in the same manner as in Example 1 for supporting hemispheres 51. No driving electrode was provided at the bottom of the supporting member 53 in this Example. The driving electrodes 55 were formed on separate turn-controlling base plate 60. In this light deflection device array also, a dielectric liquid was filled into the gap between hemispherical concaves of supporting member 53 and hemisphere bodies 51. Supporting member 53 was held between turn-controlling base plate 60 and spacer 59 having holes 61 corresponding to respective hemisphere bodies 51, which were bonded together. The upper face of spacer 59 was sealed with a base plate 56. In this light deflection device array, respective hemisphere bodies 51 can be turned independently from each other, whereby the deflection angles of the respective light beams introduced to the respective hemisphere bodies 51 can be controlled independently, and the incident light beams can be deflected onto a two-dimensional plane by the respective deflection device. Naturally, the light deflection devices may be arrayed one-dimensionally.

The mechanism for supporting a turning body is described below. A turning body can be supported at least at three supporting points. The present invention employs at least four supporting points not existing on the same hemispherical face: three supporting points on one hemispherical face and one supporting point outside this hemispherical face. When the turning body is moved to changes the supported state (turned by a turn-driving means), the turning body comes to be supported stably by two of the above three supporting points on the hemispherical face and the other one supporting point outside the same hemispherical face. The above four supporting points are respectively placed nearly at a distance of the radius of the turning body from the turning center.

The above mechanism is described in more detail. The turning body is supported by at least four points not existing on one hemispherical face on the supporting member. With this constitution, the turning body can be supported stably when the attitude of the light deflection device is changed, for example even when it is turned upside down. The supporting member has a spherical or segmental spherical space (cavity). With more supporting points, the turning body can be supported stably at varieties of the attitude. In particular, the supportable range of the attitude of the turning body can be extended greatly by making the assemblage of the supporting points in a shape of a sphere or segmental sphere in the supporting member. The turning body may be supported with a gap between the supporting point and the turning body. The gap may be filled with a liquid to support the turning body by the liquid. The supporting space is preferably spherical or segmental spherical for holding the liquid in the gap.

The above constitution enables the embodiments below with advantages respectively.

The aforementioned driving means typically includes a driving means provided on a surface of a turning body and a driving means provided on a supporting member or a position confronting the turning body with interposition of the supporting member. The non-contact electromagnetic driving means, which are provided on the surface of the turning body and on the supporting member or the position confronting the turning body with interposition of the supporting member, exert a turning force onto the spherical face. Therefore the point of action of the torque is invariably on the radius of the turning body without change of the distance between the action point and the turning center. Thereby, the turning direction and the deflection angle can readily be controlled. This light deflection device can deflect the light beam at a larger deflection angle, which enables light deflection to any desired direction. Furthermore, this driving means are non-contacting, which renders unnecessary electric wiring to the turning body surface, and is suitable for miniaturization and arraying of the light deflection device.

More specifically, the driving means is constituted of regions having different charging characteristics formed on the surface of the turning body, and driving electrodes. The charging states of the regions having different charging characteristics are preferable formed by zeta potential generated at the interface between the dielectric liquid filled in the gap and the spherical face of the turning body, but may be formed by another method such as treatment for electret treatment. Another variation of the driving means comprises an electrode on a portion of the surface of the turning body and a driving electrode, turning the sphere body by electrostatic attraction generated by application of a voltage between the electrode on a portion of the turning body and the driving electrode. A still another variation is constituted of a magnetic film formed on a part of the turning body, and an electromagnet provided on the supporting member side, where the rotation of the turning body is controlled by a magnetic force generated between the magnetic film and the electromagnet.

Another variation of the driving means turns the turning body by application of an electric field between driving electrodes provided with interposition of the turning body on both sides thereof. In this driving means, the regions having different charging characteristics may be provided on the respective hemisphere regions of the sphere. In this constitution, the turning torque can be generated symmetrically at the both sides of the sphere to control the turning movement more quickly and more stably.

A further specific embodiment is applicable. A supporting member has a space (cavity) as mentioned above. A turning body is supported through a gap in a turnable manner. The gap is preferably filled with a liquid to support the turning body smoothly with high controllability.

The deflection face portion is typically a flat face. It may be a convex face or a concave face, if necessary. However, a light beam can be controlled more readily by the flat face portion.

The deflection of a light beam may be conducted either by reflection or by refraction. In practice of deflection by reflection, a reflection layer for deflection is formed on a deflection face portion like a flat face portion, and a light beam introduced from the reflection layer side or from the reverse side thereof to the deflection face portion is deflected by reflection. In deflection by refraction, the turning body is transparent to the light beam to be deflected, the light beam is deflected by refraction according to Snell's Law by utilizing a difference of refractive index between materials constituting the interface (two materials on respective sides of the deflection layer, or the deflection face portion and the space in contact with it). The space may be filled with a liquid having a prescribed refractive index. The deflection by reflection is advantageous in a certain case since the light-introducing side and the light-emitting side are opposite relative to the turning body.

The dielectric liquid as the aforementioned liquid should be optically transparent and have a high insulation resistance. Although an organic solvent such as toluene, and acetone, or water may be used, non-volatile liquid is preferred not to volatilize from the cavity. Silicone oil is especially preferred which contains less ions and impurities and has high resistance. The electrode may be formed from a metal or a semiconductor having low resistance.

In the case where the light beam is introduced from the bottom side of the light deflection device, the device should be light-transmissive, and transparent electroconductive film is employed, including $SnO_2$, $TiO_2$, ZnO, and ITO. The supporting member should be optically transparent, and made of a hard resin such as polyethylene and polystyrene; silicone rubber; glass; or the like.

The constitution of the above supporting mechanism is explained below in more detail by reference to FIGS. 11 to 13.

Figure 11:
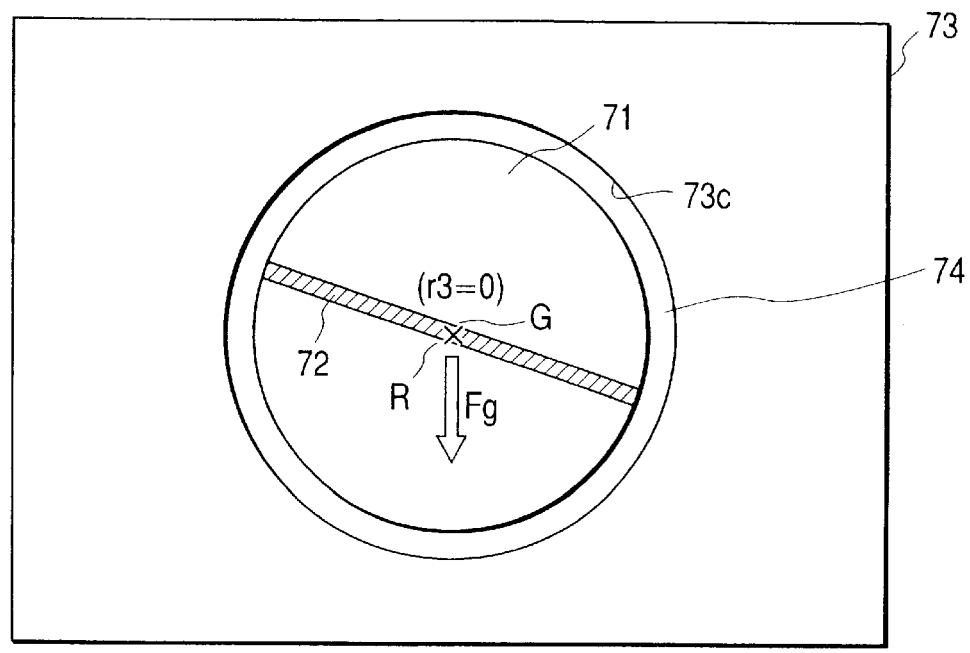
FIG. 11 is a schematic sectional view for explaining the supporting mechanism applicable in the present invention.

FIG. 11 is a schematic sectional view showing a device in which cavity 73c of supporting member 73 is spherically symmetrical to the turning center R of turning body 71 (all points of the structure are nearly at a distance of the radius from the turning center, or all points are in point symmetry to the turning center of the turning body) and turning body 71 is spherical. This light deflection device is comprised of a sphere body 71 having a light deflection flat face portion 72 at the equatorial plane in the sphere body, 71a supporting member 73 having a cavity 73c including a having spherical inner face for enclosing the sphere body 71 with a uniform gap, and lubricating oil 74 filled in the gap between the sphere body 71 and the supporting member 73. Cavity 73c of the supporting member 73 for enclosing the entire sphere is spherically symmetrical to the turning center of the turning body 71, and is capable of keeping the position of rotation center fixed irrespectively of the attitude of the turning body. Sphere body 71 has its turning center R and gravity center G at one and the same position (r3=0), which prevents turning torque (Fg×r3) caused by the resultant force Fg, and makes stable the stationary position.

Figure 12:
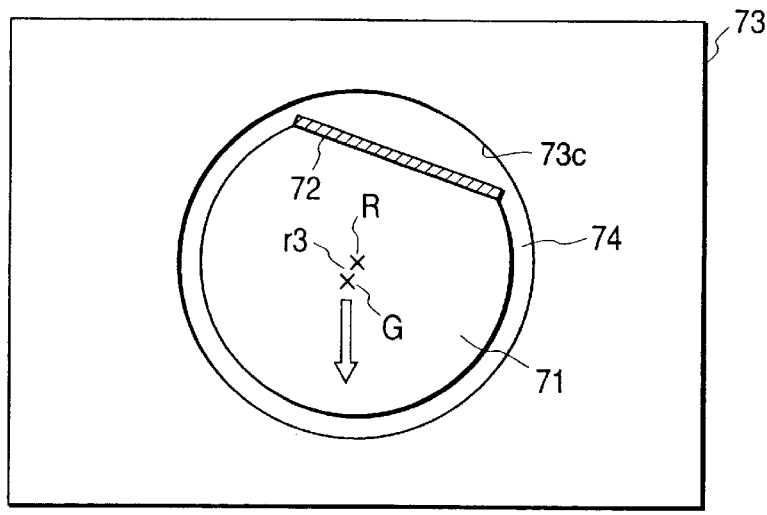
FIG. 12, FIG. 13, and FIG. 14 are schematic sectional views for explaining modifications of the supporting mechanism applicable in the present invention.

FIG. 12 is a schematic sectional view showing a device in which cavity 73c of supporting member 73 is spherically symmetrical to the turning center R of turning body 71 similarly as in FIG. 11, and a part of the face of the sphere is replaced by the light-deflection flat face portion 72. In this constitution, the position of the turning center of turning body 71 is fixed regardless of the attitude of turning body 71. Therefore, turning body 71 can be controlled in any attitude. In this device, although r3 is not zero, r3 is much less than the size of the hemisphere body, so that the turning torque (Fg×r3) is negligible, giving excellent positional stability in a stationary state.

Figure 13:
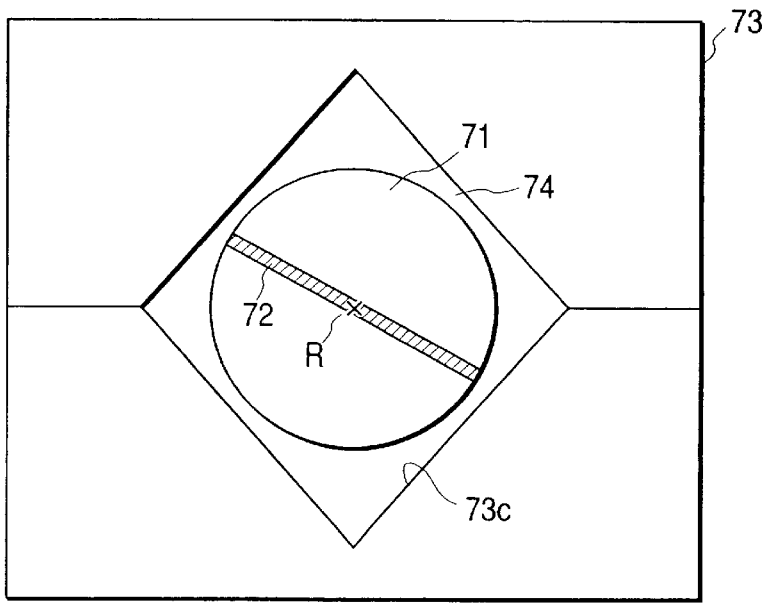

FIG. 13 is a schematic sectional view showing a device in which cavity 73c of supporting member 73 is in a shape of a combination of two cones bonded together, and is in point symmetry in all of the positions to the turning center R of turning body 71 similarly as in FIG. 11. The cavity portion which is not brought into contact with the turning body 71 may be in any shape, although FIG. 13 is a drawing for convenience. In this constitution also, the position of the turning center of turning body 71 is fixed irrespectively of the attitude of turning body 71 similarly as in FIG. 11. Turning body 71 has its turning center R and gravity center at one and the same position (r3=0), which makes stable the stationary position.

Figure 14:
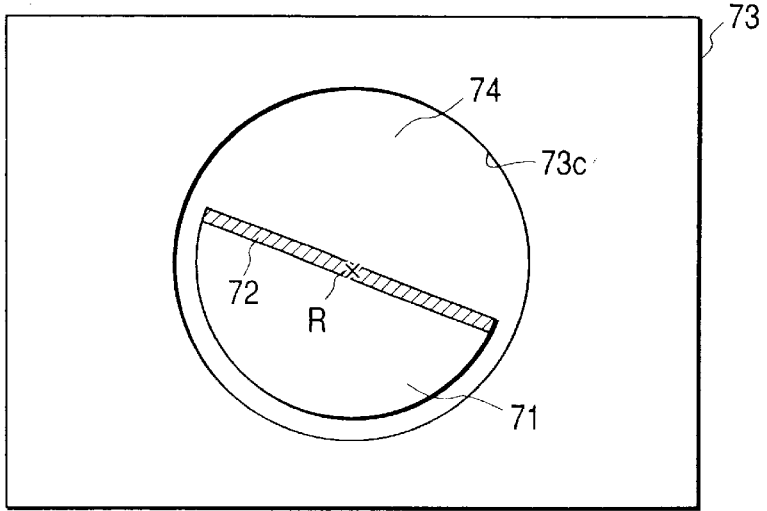

FIG. 14 is a schematic sectional view showing a device in which cavity 73c of supporting member 73 is spherically symmetrical to the turning center R of turning body 71 similarly as in FIG. 11, and the turning body is hemispherical as in the aforementioned conventional ones. In this constitution also, the position of the turning center of turning body 71 is fixed irrespectively of the attitude of turning body 71 similarly as in FIG. 11. However, the stationary position is less stable to some extent.

The light deflection devices employing the above supporting mechanism is described in detail by reference to Examples.

EXAMPLE 6

In this example, the turning body is a sphere body, and electric charge on the sphere surface is employed for the driving means. The use of electric charge on the sphere surface does not require electric wiring to the sphere surface, being advantageous in miniaturization and arraying of the device.

Figure 15A:
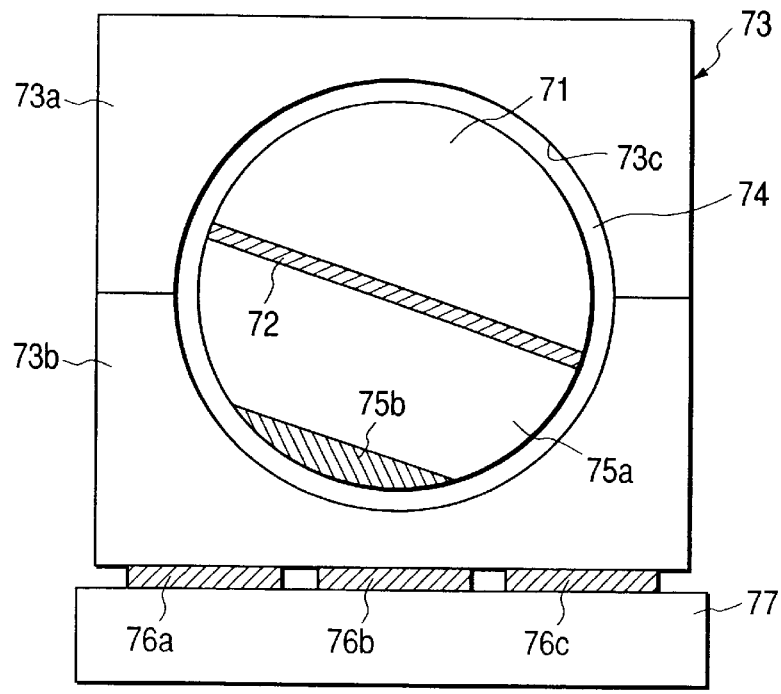
FIG. 15A and FIG. 15B are respectively a schematic sectional side view and a schematic plan view for explaining a sixth example of the light deflection device of the present invention.

FIG. 15A is a schematic sectional side view of the light deflection device of this example. The light deflection device of this example comprises a sphere body 71 having flat face portion 72 inside for deflection of incident light beams, and a supporting member 73 having cavity 73c having a spherical inside wall for enclosing the entire sphere body 71 with a uniform gap. For turning sphere body 71, chargeable regions 75a, 75b are formed as shown in FIG. 15A. chargeable region 75a surrounds most of the spherical face, and chargeable region 75b is in a bowl shape at the bottom. Driving electrodes 76a to 76e are provided under supporting member 73 to apply an electric field to sphere body 71. In this Example, the incident light is deflected by the reflection layer formed on flat face portion 72. The above-mentioned gap is filled with dielectric liquid 74 such as. silicone oil.

The driving method in this Example is described below. At the interface between the solid and the liquid, an electric double layer is formed which is constituted of a surface charge layer containing ions adsorbed from the liquid by the solid surface and a compensation charge layer distributed diffusedly in the liquid confronting to the surface charges. The surface of the solid is charged positively or negatively by ion adsorption from the liquid at an inherent surface potential called a zeta potential. In this Example, sphere body 71 has chargeable regions 75a, 75b on the surface formed from materials of different charging characteristics to liquid 74, having an electric moment as the entire sphere body, the vector direction being in the vertical direction slightly inclined in FIG. 15A. On application of an electric field to the sphere body 71 by means for driving electrodes 76a–76e, a torque is produced to move the pole direction of the charge (vector direction of the electrical moment) to equilibrate it to the electric field. The distance of the torque application point from the turning center of the sphere body 71 is equal to the radius of the sphere body 71.

Figure 15B:
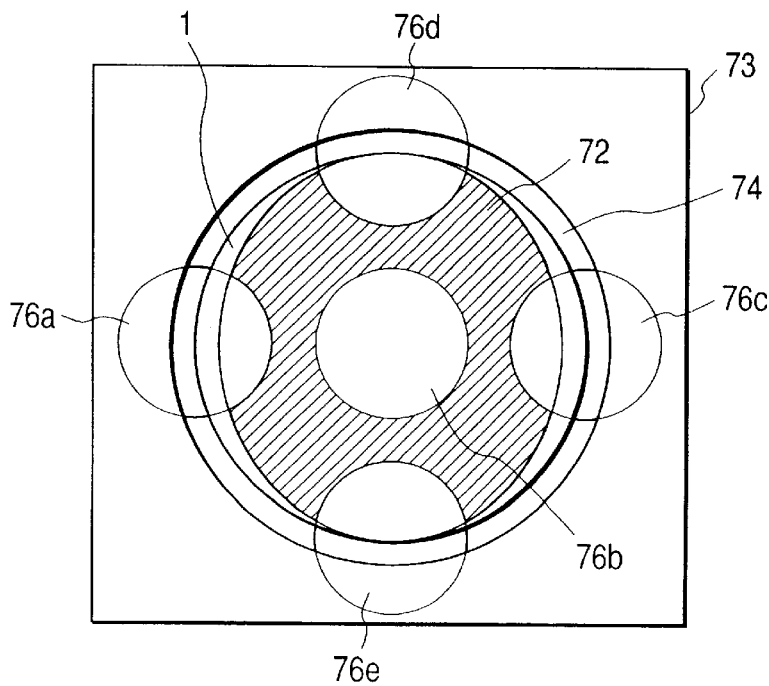

When the sphere body 71 has turned to equilibrate its pole direction with electric field direction, the torque is offset to stop the turning movement. The sphere body 71 has its turning center and gravity center at one and the same position, so that the resultant force derived from the gravity and the buoyancy does not produce a turning torque. Therefore, when the electric field application is stopped, no turning torque is applied, thereby the sphere body 71 being is held stably at the desired controlled position irrespectively of the static friction coefficient. Change of the direction of the electric field application produces torque to equilibrate the pole direction to the applied electric field, turning the sphere body 71 again to a newly indicated position. Cavity 73c of supporting member 73 is spherically symmetrical, so that the position of the turning center can be kept fixed, and the position of the sphere body 71 can be controlled irrespectively of the attitude of the sphere body 71. FIG. 15B shows an example of arrangement of driving electrodes 76a–76e relative to the sphere body 71 viewed from the top side of the light deflection device.

Figure 16A:
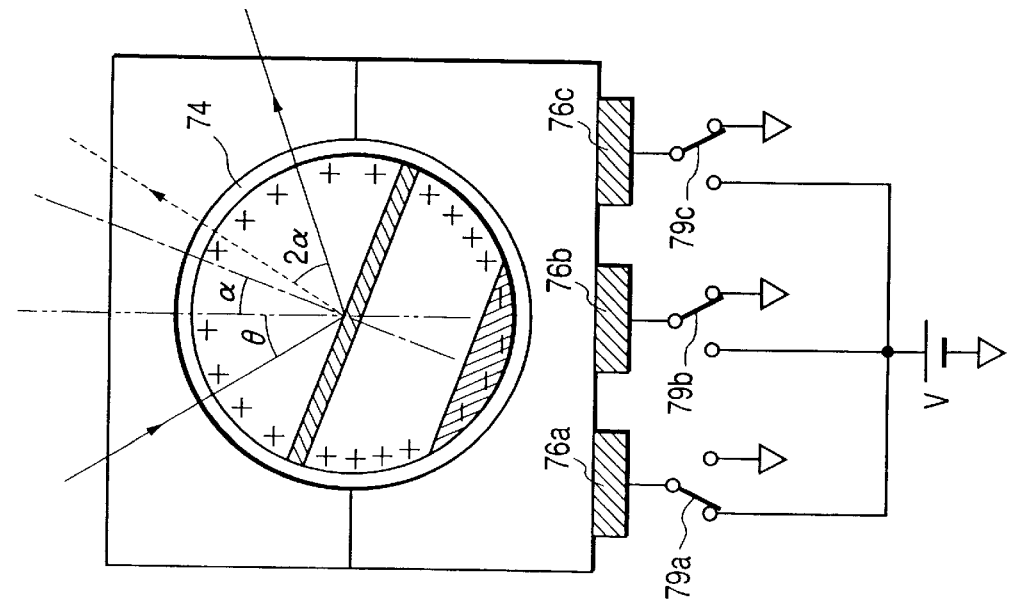
FIG. 16A and FIG. 16B are schematic sectional views for showing the states of the driving in the sixth example.
Figure 16B:
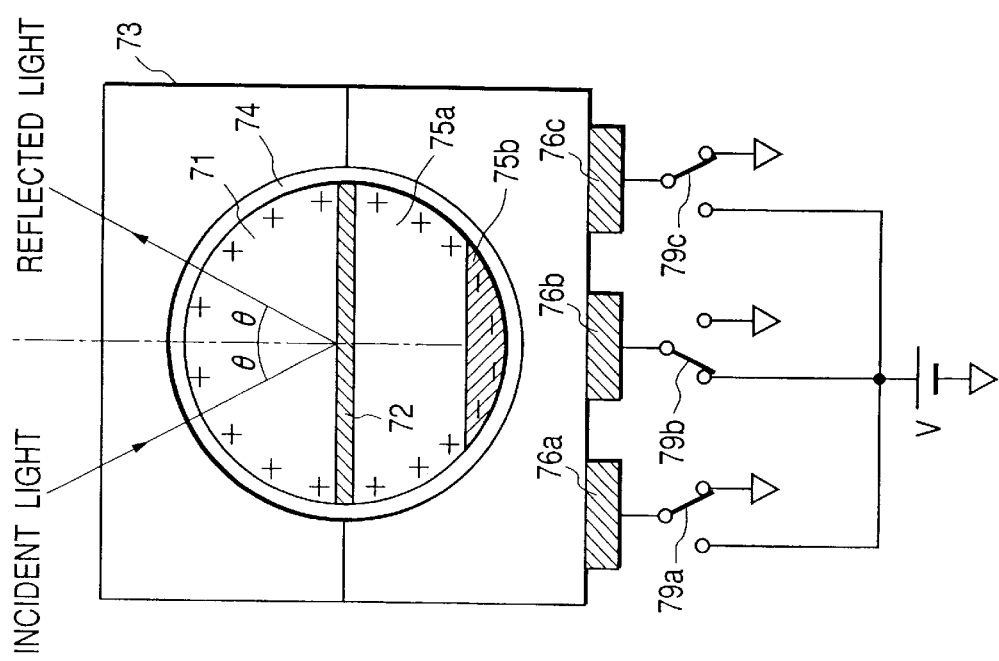

The method of driving of the light deflection device of this Example is described below in more detail by reference to FIG. 16A and FIG. 16B. In FIGS. 16A and 16B, the reversed blank triangles show common electrodes. The sphere body 71 has a negatively chargeable region 75b and a positively chargeable region 75a, which are chargeable in dielectric liquid 74. To this sphere body 71, an electric field is given by applying a positive voltage to driving electrode 76b and applying a negative voltage to other electrodes 76a, 76c (76d and 76e being not shown in the drawing) as shown in FIG. 16A. Thereby, charged region 75b directs its pole to driving electrode 76b. Thus, an incident light beam introduced at an incident angle θ to the reflection layer on flat face portion 72 is reflected at a reflection angle θ.

Subsequently, as shown in FIG. 16B, switches 79a, 79b are changed over to apply the positive voltage to driving electrode 76a and the negative voltage to other driving electrodes 76b, 76c (76d and 76e being not shown in the drawing). Thereby, the sphere body 71 is driven to turn to equilibrate the pole direction of charged region 75b with the electric field direction, the sphere body 71 changing the attitude by turning angle α. As the result, the reflected light from the reflection layer on flat face portion 72 is deflected by angle 2α in comparison with that in FIG. 16A. By changing over the switches to 79a, 79b, sphere body 71 is driven to return to the original position as shown in FIG. 16A. Further, the deflection angle of less than 2α can be obtained by applying a positive voltage to driving electrode 76a, and driving electrode 76b separately, and a negative voltage to other driving electrodes. After determining the dependence of the deflection angle on the voltage application state preliminarily, sphere 71 can be turned under control to obtain a desired deflection angle according to the memorized information on the dependence.

A process for production of the light deflection device of this Example is shown below. Sphere body 71 is prepared from micro-beads of about 100 μm diameter of quartz glass for a collimator lens of a light-emitting diode. The beads are partially cut by polishing to prepare two hemisphere bodies. The flat faces of the hemisphere bodies are bonded to an adhesive tape. Onto the spherical faces of the hemispheres, $MgF_2$ is vacuum vapor-deposited by sputtering to form chargeable region 75a. Thereafter, a photoresist is applied onto the surface of the one hemisphere body. The photoresist on a predetermined region of the hemispherical face is developed by light exposure. $MgF_2$ is removed by etching with Ar to bare a portion of the quartz glass to form chargeable region 75b. Then, a spherical face side of the other hemisphere body is fixed onto an adhesive tape. On flat face portion 72, an Al (aluminum) film is formed as the reflection layer by electron beam vapor deposition. The two hemisphere bodies are separated from the adhesive tape, and the photoresist is removed. An adhesive layer is formed on either one of the flat face portions. Finally, the two hemisphere bodies are bonded by using a registration apparatus equipped with hemisphere-holding pits, a microscope, and a three-dimensional displacement controlling mechanism to complete a sphere body 71 which has chargeable regions 75a, 75b having different charging characteristics, and contains a flat face portion 72 having a reflection layer on the equatorial plane inside.

Supporting member 73 is also made from quartz glass. On the bottom face of the quartz glass plate, a transparent electroconductive ITO film is formed by vacuum vapor deposition, and driving electrodes 76a to 76e are formed through a photolithography process and etching as shown in FIG. 15A and FIG. 15B. The upper face of this quartz glass is coated with a Cr (chromium) film and an Au (gold) film successively by electron beam vapor deposition to form a mask. A part of the Cr—Au mask is removed by a photolithography process and etching in a pattern of a circle. Through the pattern-removed portion, the quartz glass is etched off isotropically by an aqueous hydrofluoric acid solution to form a hemispherical concave on lower supporting member 73b. Separately, upper supporting member 73a is prepared in the same manner except that the electrodes are not provided. Finally, sphere body 71 having the reflection layer, and chargeable regions 75a, 75b is placed in the hemispherical concave of lower supporting member 73b, and upper supporting member 73a and lower supporting member 73b are press-bonded with an adhesive in dielectric liquid 74 comprised of a silicone oil to enclose tightly dielectric liquid 74 and sphere body 71. Thus the light deflection device of this Example is completed.

The operation of the deflection device is described below. To the light deflection device prepared above, a voltage of +100 V was applied between driving electrode 76a and other driving electrodes. Thereby, sphere body 71 was driven to turn to obtain the angle α of 20° as shown in FIG. 16B. Thus the deflection angle was changed by 40° (2α) from that of FIG. 16A. After completion of the turning movement, the deflection angle of reflection light was kept unchanged without application of the voltage. Further, the light deflection device had excellent stationary positional stability such that the deflection angle was not affected by the change of the attitude of the device. Subsequently, a voltage of +100 V was applied between driving electrode 76c at the right side and other driving electrodes. Thereby, the angle α was changed to −20° to change the deflection angle to −40°. After stopping of the turning movement, the deflection angle was kept unchanged without application of the voltage.

As described above a light deflection of 80° was practicable with the light deflection device of this Example. Further, a light deflection of 80° in the direction perpendicular to the aforementioned deflection (perpendicular to the drawing paper sheet) could be conducted by application of a voltage to driving electrode 76d, or driving electrode 76e. The driving control was practicable with reproducibility in any attitude including an upside-down reversed position.

EXAMPLE 7

In this Example, the turning body is a segmental sphere body in which a part of the spherical face is replaced by a flat face. FIG. 17 shows schematically a sectional view of the constitution of the device of this Example. The device is constituted of a segmental sphere body 71' having a flat face portion 72' replacing a part of the sphere, a supporting member 73 including cavity 73c having an inner spherical wall for enclosing the segmental sphere body 71' with a uniform gap, lubricating liquid 74 filled in the gap between the segmental sphere body 71' and the supporting member 73, and a driving means including electrodes. In this Example, the bonding of two hemisphere bodies is not necessary, whereby the production process can be simplified.

The production process of the device is described below in detail. Segmental sphere body 71' is prepared from a micro-bead of about 100 μm diameter of quartz glass for a collimator lens of a light-emitting diode. A part of the bead is removed by polishing to form a flat face portion 72'. The flat face portion 72' of the segmental sphere body 71' is fixed onto an adhesive tape. Onto the spherical face of segmental sphere body, MgF$_2$ is vacuum vapor-deposited by sputtering to form a chargeable region 75'a. Thereafter, a photoresist is applied onto the surface of segmental sphere body 71'. The photoresist on a predetermined region of the spherical surface of the segmental sphere body is developed by light exposure. MgF$_2$ is removed by etching with Ar to bare a portion of the quartz glass to form a chargeable region 75'b. Then, spherical face side of segmental sphere body 71' is fixed onto an adhesive tape. On flat face portion 72', an Al (aluminum) film is formed as the reflection layer by electron beam vapor deposition. Segmental sphere body 71' is separated from the adhesive tape, and the photoresist is removed. Thus, segmental sphere body 71' is completed which has chargeable regions 75'a, 75'b having different charging characteristics, and having a flat face portion 72' having a reflection layer in place of a part of the spherical face.

Supporting member 73 is also made from quartz glass in a similar manner as in Example 6. On the bottom face of the quartz glass plate, a transparent electroconductive ITO film is formed by vacuum vapor deposition, and driving electrodes 76a to 76c are formed through a photolithography process and etching. The upper face of this quartz glass is coated with a Cr (chromium) film and an Au (gold) film successively by electron beam vapor deposition to form a mask. A part of the Cr—Au mask is removed by a photolithography process and etching in a pattern of a circle. Through the pattern-removed portion, the quartz glass is etched off isotropically by an aqueous hydrofluoric acid solution to form a hemispherical concave on lower supporting member 73b. Separately, upper supporting member 73a is prepared in the same manner except that the electrodes are not provided. Finally, the segmental sphere body 71' having the flat face portion 72' having including the reflection layer, and chargeable regions 75'a, 75'b are placed in the hemispherical concave of lower supporting member 73b, and upper supporting member 73a and lower supporting member 73b are press-bonded with an adhesive in dielectric liquid 74 composed of a silicone oil to enclose tightly the dielectric liquid 74 and segmental sphere body 71'.

The light deflection device prepared above was evaluated by the same driving method under the same driving conditions as in Example 6, and was found to have nearly the same excellent properties as that of Example 6.

EXAMPLE 8

In this Example, the light deflection is conducted by refraction, not by reflection, at the light deflection portion. FIG. 18 is a schematic sectional side view of the light deflection device of this Example. The light deflection device comprises light-transmissive sphere body 71 comprised of two solid hemisphere bodies 71a, 71b having different refractive indexes; a flat face portion 72 formed from the bonding interface between the two hemisphere bodies 71a, 71b; a supporting the member 73 for supporting sphere body 71 in a turnable manner through a gap; liquid 74 filled in the gap between the sphere body 71 and supporting member 73; chargeable regions 75a, 75b having different charging properties provided on the spherical face of sphere body 71; and driving electrodes 76a to 76c other electrodes are not shown for applying an electric field provided at the lower portion of the supporting member 73. An incident light beam introduced from supporting member 73 is deflected at flat face portion 72 by difference of the refractive indexes between the two hemispheres 71a, 71b constituting the sphere body 71. In this device, the refractive indexes of the hemisphere body 71b, liquid 74, and supporting member 73 are equalized to prevent light refraction at the interface between the upper hemisphere body 71b and liquid 74, and at the interface between liquid 74 and supporting member 73. However, this is not essential. The refraction indexes may be different, provided that the driving state and the deflection angle correspond one-to-one. With the light deflection device of this Example, the sphere body 71 is driven to turn with the same driving means in the same method as in Example 6.

When hemisphere body 71 is turned by an angle α relative to the incident light beam introduced through the bottom of supporting member 73, the angle β of deflection from the incident light beam is shown by the equation below according to Snell's Law:

$$\beta = \sin^{-1}[(n_2 \cdot \sin \alpha)/n_1] - \alpha$$

where $n_1$ is the refractive index of the upper the hemisphere body 71b, and $n_2$ is the refractive index of the lower hemisphere body 71a.

Specifically, the light deflection device is produced in the same manner as in Example 6 except that the upper hemisphere body 71b was prepared from a micro-bead having a refraction index of 1.33 and a diameter of 100 μm, and the lower hemisphere body 71a was prepared from a micro-bead having a refraction index of 1.9 and a diameter of 100 μm for collimator lens. The reflection layer was not provided at the flat face portion 72. The adhesive used for bonding the two hemisphere bodies was light-transmissive, and had a refractive index equal to that of the one of hemisphere bodies 71a, 71b. However, the refraction index is not limited thereto, provided that the driving state and the deflection angle correspond one-to-one each with other. After determining the dependence of the deflection angle on the voltage application state preliminarily, the hemisphere body 71 can be turned under control to obtain a desired deflection angle according to the memorized information of the dependence.

The arrangement of driving electrodes 76a, 76b, 76c, 76d, and 76e (76d and 76e being not shown in the drawing) relative to sphere body 71 was the same as that in Example 6. On application of a voltage of +100 V between driving electrode 76a and other driving electrodes, sphere body 71 was driven to turn at an angle α of 20° as shown in FIG. 18. After stopping of the turning movement, the angle α kept unchanged without application of the voltage. Further, the light deflection device had excellent stationary positional stability such that the deflection angle was not affected by the change of the attitude of the device. From the above specific numerical values, the angle β was calculated to be 9° according to the above equation. That is, the reflected light beam was deflected by 9° relative to the incident light beam. The driving control was practicable with reproducibility in any attitude including an upside-down reversed position.

EXAMPLE 9

The device in this Example has a movable electrode, instead of chargeable regions, on the sphere body. FIG. 19 is a schematic sectional view of the device of this Example. The device comprises a sphere body 71 having a flat face portion 72 inside for deflecting an incident light beam, a supporting member 73 for supporting the sphere body 71 in a turnable manner through a gap, a movable electrode 75 at the bottom portion of the spherical face of sphere body 71, and driving electrodes 76a to 76c for applying an electric field under the supporting member 73.

A fixed electrode 78 is provided on the face of the supporting member 73 for supporting the bottom of the sphere body 71. The fixed electrode 78 is wired, for example, along the internal face of the hemispherical concave of the supporting member 73 from the outside. The sphere body 71 turns with movable electrode 75 in contact with the fixed electrode 78. A power source is connected to apply a voltage between the fixed electrode 78 and driving electrodes 76a to 76c. On application of a voltage between the fixed electrode 78 driving electrode 76a to 76c, the voltage comes to be applied between the movable electrode 75 in contact with the fixed electrode 78 and driving electrodes 76a to 76c, whereby a torque is produced by electrostatic force to turn the sphere body 71. Thereby, the flat face portion 72 change direction to deflect the light beam reflected by the reflection layer on the flat face portion. The fixed electrode 78 is placed to be invariably in contact with the movable electrode 75 irrespectively of the turning of sphere body 71.

The light deflection device was produced generally in the same manner as in Example 6 except the part of the process below. Movable electrode 75 was formed by sputtering of Pt (platinum) by vacuum vapor deposition in the same manner as the formation of the chargeable $MgF_2$ region in Example 6. The supporting member 73 was prepared in the same process as in Example 6, and additionally, the face of the supporting sphere body 71 on the lower supporting member was coated with Ta (tantalum) by electron beam vapor deposition, and therefrom the fixed electrode 78 was formed by a photolithography process and etching. Since the movable electrode 75 and the fixed electrode 78 are invariably in contact with each other, and slide during turning of the sphere body 71, materials of high mechanical hardness were employed.

With the light deflection device thus prepared, a dielectric liquid 74 of a silicone oil was filled into the gap between the sphere body 71 and the supporting member 73, and a voltage was applied between driving electrode 76a to 76c and the fixed electrode 78. Thereby, the sphere body 73 was driven to turn by electrostatic force generated between driving electrode 76a to 76c and the movable electrode 75, giving approximately the same characteristics as that of Example 6. Separately, without filling the silicone oil, voltage was applied in the same manner between driving electrode 76a to 76cand the fixed electrode 78, whereby the sphere body 71 was driven to turn similarly. The light deflection device of this Example does not necessarily require dielectric liquid 74. The sphere body 71 could be turned by electrostatic torque generation without dielectric liquid 74.

EXAMPLE 10

In this example, a sphere body 71 having hemisphere regions of different charging properties is driven by an electric field applied between driving electrodes provided on a lower base plate 77 and an upper base plate 80. This Example shows a process for forming a supporting member which is suitable for array formation and for mass production at a low cost.

FIG. 20 is a schematic sectional view of the light deflection device of this Example. The light deflection device comprises a sphere body 71 having a flat face portion 72 inside for deflecting incident light beams, supporting member 73 having a cavity 73c including a spherical inner wall for enclosing the entire sphere body 71 through a uniform gap, an upper base plate 80 and a lower base plate 77 for holding therebetween the supporting member 73, dielectric liquid 74, driving electrodes 76ato 76e 76f to 76J provided respectively on the lower base plate 77 and upper base plate 80 for application of electric field to sphere body 71 (76d, 76e, 76i, and 76j being not shown in the drawing), and chargeable regions 75a, 75b having different charging properties formed on the respective hemispherical face of the sphere body 71 for the sphere body 71.

The method of driving of this light deflection device is described below. The sphere body 71 in this Example has, on its respective hemispherical faces, chargeable region 75a, or 75b formed from a material of charging properties different from each other in dielectric liquid 74, exhibiting an electric moment 81 as the entire sphere body. In this Example, five driving electrodes 76a to 76e (76d and 76e being not shown in the drawing) are provided on lower base plate 77 in the same arrangement as in Example 6, and an additional five driving electrodes 76f to 76j (76i and 76j not shown in the drawing) are provided on the upper base plate 80 in the same arrangement as on the lower base plate 77, whereby an electric field is produced between the upper and lower electrodes to turn sphere body 71 by the electric moment 81 of sphere body 71.

With this constitution by switches not shown in the drawing, for example, a positive voltage is applied to driving electrode 76b on the lower base plate 77, a negative voltage is applied to driving electrode 76g on the upper base plate 80, and the other electrodes are grounded. Thereby, the sphere body 71 turns to equilibrate an electric moment 81 of sphere body with the electric field produced between driving electrodes 76b and 76g, reflecting an incident light beam introduced at an incident angle θ at a reflection angle θ (see FIG. 16A). Subsequently, by changing over the switches, a positive voltage is applied to driving electrode 76a on the lower base plate 77, a negative voltage is applied to driving electrode 76h on the upper base plate 80, and the other electrodes are grounded. Thereby, the sphere body 71 turns to equilibrate the electric moment 81 of sphere body with the electric field produced between driving electrodes 76a and 76h. Thereby the hemisphere turns by turning angle α to deflect the reflected light beam by an angle 2α (see FIG. 16B).

A process for producing the light deflection device of this Example is shown below. The sphere body 71 is prepared from micro-beads of about 100 μm diameter of quartz glass for a collimator lens of a light-emitting diode. A part of the beads is removed by polishing to prepare two hemisphere bodies. The flat face of one of the hemisphere bodies is bonded to an adhesive tape. Onto the spherical face of the hemisphere, $MgF_2$ is vacuum vapor-deposited by sputtering to form chargeable region 75a. The other hemisphere is bonded at the spherical face to an adhesive tape. Onto the flat face portion of this hemisphere, Al (aluminum) film is formed as the reflection layer by electron beam vapor deposition. In this hemisphere, quartz glass itself constituting the hemisphere serves as the chargeable region 75b. The adhesive tape is taken off from the two hemisphere bodies and the photoresist is removed. An adhesive layer is formed on either one of the flat face portions. Finally, the two hemisphere bodies are bonded by using a registration apparatus equipped with hemisphere-holding pits, a microscope, and a three-dimensional displacement controlling mechanism to complete a sphere body 71 which has chargeable regions 75a, 75b having different charging characteristics, and contains a flat face portion 72 having a reflection layer on the equatorial plane inside.

This sphere body 71 is mixed with an elastomer. The elastomer is cured in a sheet shape. The elastomer sheet is swollen by immersion in a silicone oil to form a cavity around sphere body 71 to prepare supporting member 73. Specifically, sphere body 71 is embedded into two-pack type silicone rubber (Silpot 184, produced by Dow Corning Co.). The silicone rubber paste is poured into a mold to form a rectangle body about 200 μm in thickness, and is cured by heating at 100° C. for one hour. The cured matter is separated from the mold. The cured silicone rubber is immersed for swelling in a silicone oil (produced by Toshiba Silicone Co.) having a viscosity of 2 cs. Thereby, a cavity is produced around the sphere body 71 with a gap of 5 μm to obtain supporting member 73, and simultaneously the silicone oil as lubricating liquid 74 is filled into the cavity.

Finally the obtained supporting member 73 having sphere body 71 and lubricating liquid 74 in the cavity is placed between the lower glass base plate 77 and the upper glass base plate 78, having respectively driving electrodes 76a to 76e and 76f to 76j formed from transparent electroconductive material like ITO. Thus the light deflection device is prepared.

With the light reflection device prepared above, a voltage, for instance −100 V, was applied to lower driving electrode 76a relative to upper driving electrode 76h. Thereby, the sphere body 71 was driven to turn by angle α of 20° as shown in FIG. 20 to deflect the reflected light by 40°. After completion of the turning movement, the deflection angle of reflection light was kept unchanged without application of the voltage. Further, the light deflection device had excellent stationary positional stability such that the deflection angle was not affected by the change of the attitude of the device similarly as that of Example 6. Further, in this constitution having driving electrodes on the upper and lower base plates, the turning speed was higher by a factor of 2 to 5.

The process for forming the supporting member disclosed in this Example is suitable for mass production in consideration of cost reduction and two-dimensional device array formation. In the light deflection element array having light deflection elements arranged two-dimensionally, the respective sphere body can be turned independently to control deflection angle, whereby incident light beams can be deflected two-dimensionally. Such a two-dimensional array can be produced by a relatively simple process at a low cost as follows. A mold is provided which has spherical concaves arrayed on the bottom thereof in an appropriate pitch. The sphere bodies are placed in the concaves. A silicone rubber is filled, cured, and taken out. The bared sphere body portions corresponding to the mold concave positions are covered with additional silicone rubber in another mold by filling, curing, and taking off of the silicone rubber. Then cavities are simultaneously formed by a swelling process.

As described above, the inside of the supporting member can hold a spherical or segmental spherical turning body by contact at four points at least not on a sphere and at a distance approximate to the turning radius from the turning center. Preferably, the inside shape of the supporting member is point-symmetrical at least three points relative to the turning center (approximate to the distance of radius), and more preferably, spherically symmetrical to drive stably the spherical or segmental spherical turning body irrespectively of the attitude of the device. Further, the turning body designed to be in a shape of a sphere or approximate thereto to coincide approximately with the turning center and the gravity center will give excellent stationary positional stability without producing torque resulting from gravity and buoyancy, and resistant to external vibration.

Furthermore, by applying the turning force to the spherical face of the turning body, the torque application point is invariably at the distance of radius from the turning center point to facilitate the control of the turning direction and angle of the turning body, to make the device simpler and suitable for miniaturization and array construction. Thereby, a light deflection device is provided in which the turning range of the turning body can be made larger to obtain a larger light deflection angle. Furthermore, non-contacting driving of the turning body makes easier the sealing of a liquid like a dielectric liquid around the turning member.

What is claimed is:
1. A light deflection device comprising:
 a deflection member having a sphere body enclosing a deflection face portion for deflecting a light beam, or a segmental sphere body having the deflection face portion and a segmental sphere face opposing the deflection face portion;

a supporting member for supporting the deflection member in a turnable manner; and driving means for turning the deflection member, said driving means being provided at a position opposing the sphere face of the sphere body, or the segmental sphere face of the segmental sphere body, to apply an electrostatic force to the sphere face of the sphere body or the segmental sphere face of the segmental sphere body.

2. The light deflection device according to claim 1, wherein the deflection member comprises two regions having different charging properties on the sphere face of the sphere body or the segmental sphere face of the segmental sphere body, and the driving means comprises an electrode for producing an electric field in vicinity of the sphere face of the sphere body or the segmental sphere face of the segmental sphere body.

3. The light deflection device according to claim 1, wherein the driving means comprises a first electrode provided on the sphere face of the sphere body or the segmental sphere face of the segmental sphere body, a second electrode provided on the supporting member, and a means for applying a voltage between the first electrode and the second electrode.

4. The light deflection device according to claim 1, wherein the deflection member is the segmental sphere body, the supporting member has a concave having an internal face in a shape of a segmental sphere face, and the segmental sphere body is placed in the concave.

5. The light deflection device according to claim 4, wherein a gap is provided between the segmental sphere face and the concave of the supporting member, and the gap is filled with a dielectric liquid.

6. The light deflection device according to claim 4, wherein the segmental sphere face of the segmental sphere body is a hemispherical face, and the deflection face portion is a plane.

7. The light deflection device according to claim 4, wherein the segmental sphere body comprises a material capable of transmitting the light beam, and the deflecting face portion deflects the light beam transmitted through the segmental sphere body.

8. The light deflection device according to claim 1, wherein the deflection member is the sphere body, and the supporting member has a space holding the deflection member.

9. The light deflection device according to claim 8, wherein an internal face of the space of the supporting member is a spherical face.

10. The light deflection device according to claim 8, wherein an internal face of the space of the supporting member comprises a shape of a combination of two cones bonded together.

11. The light deflection device according to claim 8, wherein a gap is provided between the deflection member the internal face of the space, and the gap is filled with a dielectric liquid.

12. The light deflection device according to claim 8, wherein the deflection member comprises a sphere body comprised of two members having a refractive index different from each other, partitioned by the deflection face portion.

13. The light deflection device according to claim 1, wherein a reflection layer is provided for reflecting a light beam on the deflection face of the deflection member.

14. A light deflection device array, comprising an arrangement of light deflection devices set forth in any one of claims 1 to 13 in a one-dimensional or two-dimensional array.

15. A light deflection device comprising:

a deflection member having a segmental sphere body having a deflection face portion and a segmental sphere face opposing the deflection face portion;

a supporting member for supporting the deflection member in a turnable manner; and driving means for turning the deflection member, said driving means being provided at a position opposing the segmental sphere face of the segmental sphere body, to apply an electrostatic force to the segmental sphere face of the segmental sphere body.

16. The light deflection device according to claim 15, wherein the deflection member comprises two regions having different charging properties on the segmental sphere face of the segmental sphere body, and the driving means comprises an electrode for producing an electric field in vicinity of the segmental sphere face of the segmental sphere body.

17. The light deflection device according to claim 15, wherein the driving means comprises a first electrode provided on the segmental sphere face of the segmental sphere body, a second electrode provided on the supporting member, and means for applying a voltage between the first electrode and the second electrode.

18. The light deflection device according to claim 15, wherein the deflection member is the segmental sphere body, the supporting member has a concave having an internal face in a shape of a segmental sphere face, and the segmental sphere body is placed in the concave.

19. The light deflection device according to claim 18, wherein a gap is provided between the segmental sphere face and the concave of the supporting member, and the gap is filled with a dielectric liquid.

20. The light deflection device according to claim 18, wherein the segmental sphere face of the segmental sphere body is a hemispherical face, and the deflection face portion is a plane.

21. The light deflection device according to claim 18, wherein the segmental sphere body comprises a material capable of transmitting the light beam, and the deflecting face portion deflects the light beam transmitted through the segmental sphere body.

22. A light deflection device array, comprising an arrangement of light deflection devices set forth in any one of claims 15 to 21 in a one-dimensional or two-dimensional array.

* * * * *

UNITED STATES PATENT AND TRADEMARK OFFICE
CERTIFICATE OF CORRECTION

PATENT NO.   : 6,154,302
DATED        : November 28, 2000
INVENTOR(S)  : Takayuki Yagi, et al.

It is certified that error appears in the above-identified patent and that said Letters Patent is hereby corrected as shown below:

Column 1,
Line 23, "array" should read -- array is --.

Column 4,
Line 25, "in fifth" should read -- in a fifth --; and
Line 40, "a eighth" should read -- an eighth --.

Column 5,
Line 45, "a" should be deleted.

Column 6,
Line 2, "to" should read -- to the --; and
Line 41, "vertical" should read -- vertically --.

Column 7,
Line 33, "an" should read -- a --.

Column 8,
Line 5, "region" should read -- regions --;
Line 6, "Finally" should read -- Finally, a --;
Line 8, "use" should read -- the use --;
Line 13, "electrode." should read -- electrodes. --;
Line 23, "electrode." should read -- electrodes. --; and
Line 55, "Above" should read -- above the --.

Column 9,
Line 8, "necessary similarly" should read -- necessarily similar --; and
Line 33, "After" should read -- After that --.

Column 10,
Line 20, "region" should read -- regions --;
Line 21, "electrode" should read -- electrodes --;
Line 46, "driving" should read -- a driving --;
Line 49, "driving" should read -- a driving --; and
Line 68, "flat the" should read -- flat --.

Column 11,
Line 17, "33afor" should read -- 33a for --.

UNITED STATES PATENT AND TRADEMARK OFFICE
CERTIFICATE OF CORRECTION

PATENT NO. : 6,154,302
DATED : November 28, 2000
INVENTOR(S) : Takayuki Yagi, et al.

It is certified that error appears in the above-identified patent and that said Letters Patent is hereby corrected as shown below:

Column 12,
Line 15, "changes" should read -- change --;
Line 31, "attitude." should read -- attitudes. --;
Line 48, "are" should read -- is -- ;
Line 51, "exert" should read -- exerts --; and
Line 59, "are" should read -- is --.

Column 13,
Line 10, "A still" should read -- Still --.

Column 14,
Line 9, "body, 71a" should read -- body 71, a --; and
Line 10, "a having" should read -- a --.

Column 15,
Line 8, "charge-" should read -- Charge --;
Line 9, "75asurrounds" should read -- 75a surrounds --;
Line 15, "as." should read -- as --;
Line 43, "being" should be deleted; and
Line 56, "driving of" should read -- driving --.

Column 16,
Line 66, "is" should read -- are --.

Column 17,
Line 21, "stopping of" should read -- stopping --.

Column 18,
Line 21, "having including" should read -- including --;
Line 48, "other" should read -- (other --; and
Line 49, "shown" should read -- shown) --.

Column 19,
Line 6, "upper the" should read -- upper --; and
Line 64, "78 driving electrode" should read -- 78 and driving electrodes --.

Column 20,
Line 2, "change" should read -- changes --;
Line 8, "except" should read -- except for --;
Lines 25, 28, and 31, "electrode" should read -- electrodes --; and
Line 32, "76cand" should read -- 76c and --.

UNITED STATES PATENT AND TRADEMARK OFFICE
CERTIFICATE OF CORRECTION

PATENT NO. : 6,154,302
DATED : November 28, 2000
INVENTOR(S) : Takayuki Yagi, et al.

It is certified that error appears in the above-identified patent and that said Letters Patent is hereby corrected as shown below:

Column 21,
Line 9, "switches" should read -- switches, --.

Column 23,
Line 58, "member" should read -- member and --.

Signed and Sealed this

Fourth Day of December, 2001

*Attest:*

*Nicholas P. Godici*

NICHOLAS P. GODICI
*Attesting Officer*      *Acting Director of the United States Patent and Trademark Office*